US011051644B2

(12) United States Patent
Silverman

(10) Patent No.: US 11,051,644 B2
(45) Date of Patent: Jul. 6, 2021

(54) SMART ADDRESS IDENTIFICATION AND SECURE MAILBOX

(71) Applicant: Lawrence Silverman, Newton Square, PA (US)

(72) Inventor: Lawrence Silverman, Newton Square, PA (US)

( * ) Notice: Subject to any disclaimer, the term of this patent is extended or adjusted under 35 U.S.C. 154(b) by 0 days.

(21) Appl. No.: 16/437,449

(22) Filed: Jun. 11, 2019

(65) Prior Publication Data

US 2020/0138223 A1    May 7, 2020

Related U.S. Application Data

(60) Provisional application No. 62/655,954, filed on Apr. 11, 2018.

(51) Int. Cl.
| | | |
|---|---|---|
| *A47G 29/12* | (2006.01) | |
| *G08B 21/02* | (2006.01) | |
| *H04W 12/037* | (2021.01) | |
| *G16Y 20/10* | (2020.01) | |
| *H02J 7/34* | (2006.01) | |
| *G16Y 40/10* | (2020.01) | |
| *G16Y 10/35* | (2020.01) | |
| *H02J 7/35* | (2006.01) | |
| *G16Y 40/50* | (2020.01) | |

(52) U.S. Cl.
CPC ......... *A47G 29/1209* (2013.01); *G08B 21/02* (2013.01); *H04W 12/037* (2021.01); *G16Y 10/35* (2020.01); *G16Y 20/10* (2020.01); *G16Y 40/10* (2020.01); *G16Y 40/50* (2020.01); *H02J 7/345* (2013.01); *H02J 7/35* (2013.01)

(58) Field of Classification Search
CPC ...... A47G 29/1209; G06F 1/30; G08B 21/02; G08B 29/02; G08B 29/18; G08B 29/181; G08B 27/005; H04W 12/0017; Y04S 20/36
USPC ......... 340/310.01, 310.02, 506, 539.13, 531, 340/541, 657; 700/295; 705/412; 709/217, 223, 226
See application file for complete search history.

(56) References Cited

U.S. PATENT DOCUMENTS

| | | | | |
|---|---|---|---|---|
| 8,786,189 | B2 * | 7/2014 | Mayfield | ............... G08B 19/005 315/76 |
| 2006/0276938 | A1 * | 12/2006 | Miller | ..................... G05B 15/02 700/295 |
| 2011/0204720 | A1 * | 8/2011 | Ruiz | ................. H02J 13/00002 307/66 |

(Continued)

*Primary Examiner* — Omeed Alizada
(74) *Attorney, Agent, or Firm* — BakerHostetler

(57) ABSTRACT

An improved system, apparatus, and method for numbering and identifying houses, buildings, equipment, vehicles, paths and other locations, that provides a more effective, secure and reliable interface between a location/occupant and those outside seeking to locate them or to make a secure delivery, including, for example, emergency first responders, postal and package delivery service providers, visitors and individuals unfamiliar with an area are disclosed. Further, a system, apparatus, and method to generate, receive and communicate information, designed to operate and respond in everyday use as well as a critical emergency are disclosed. An integrated network of wired and wireless communication connecting a neighborhood, a city, a town, and/or an isolated rural home site or location are disclosed.

10 Claims, 26 Drawing Sheets

(56) References Cited

U.S. PATENT DOCUMENTS

2013/0257623 A1* 10/2013 Bagasra ................ G01D 4/004
   340/657
2017/0122774 A1* 5/2017 Quady .................. G01D 4/002

* cited by examiner

FIG. 1A  INDEX OF FUNCTIONS - BRIEF DESCRIPTION OF FUNCTIONAL ELEMENTS

| Functional Module | | Description | Refs. and examples |
|---|---|---|---|
| (1) | POWER | Concentrating Lens | Lens to increase angular capture of sunlight by PV; may be embossed with patterns e.g. Fresnel, moth's eye – FIG. 5, 13, 28. Venturi lens to focus wind – FIG. 24. |
| | | Power source | Solar Photovoltaic cell (PV) to convert sunlight to electricity – FIG. 5,13, 28 . Wind generator – FIG. 24. Manual generator – FIG. 27. Mains or standby generator – FIG. 5, 6, 18, 20A B , 21, 28-29, 32, . |
| | | Power electronics- Sensor, Charge control charging status | Circuit to monitor & control charge rate and storage level – FIG. 5 . Daylight sensor, proximity sensor, badge scanner and/or other sensors (FIG. 33) |
| | | Energy Storage | Rechargeable Batteries (sealed, submersible) – FIG. 5, super-cap – FIG. 5, heated liquid, fuel cell |
| | | Voltage Outputs | Transformers, Multiple voltage AC and/or DC output, e.g. 12V DC, 6V DC, 18V outputs and output voltages as needed for devices, SLS drivers |
| (2) | LIGHT | Light Module | SLS arrays (e.g. LEDs, lasers - configured for front, edge and/or back-lighting of visual ID display (FIG. 6, 7-10, 13, 20-21, 22, 23, 28-29). Sensors for daylight, motion, proximity, alert and/or transceiver (FIG. 6-14, 18, 20-23, 28-29). Automated color codes (FIG. 3) |
| (3) | TRANSCEIVER | Transceiver Devices ("Xceiver") | A Transceiver device will connect an SAID device to a corresponding network enabling it to interoperate with another SAID device on a network via a compatible second transceiver. A Transceiver device may be specific to a single network, or may be able to connect to more than one network. FIG. 3, 11, 15, 16, 25, 26. An SAID transceiver is included with communicating SAID devices and modules without being specifically noted in a drawing. |
| (4) | ACCESSORIES MODULE | Accessories Module | An Accessories module is a dedicated SAID element that houses at least one SAID accessory device. To facilitate installation SAID accessory devices and to simplify future SAID system expansion, an SAID Accessories module includes one or more power buses and data connection capability. An Accessories module can interconnect in a stack of SAID modules in an SAID station. See FIG. 14-17, 25. |
| (5) | ADDRESS ID | Address ID | An SAID Address ID can be as simple as a set of visual alphanumeric characters that attach to a surface illuminated by an SAID Light module or as complex as a multi-layer visual display incorporating one or more of a multicolor light source, transceiver, microcontroller, transducer and other SAID devices as disclosed in the specification. Ref. FIG. 6-23, 25-26, 28-29. |

FIG. 1B   BRIEF DESCRIPTION OF FUNCTIONAL ELEMENTS

| Functional Module | | Description | Refs. and examples |
|---|---|---|---|
| (6) | SECURE STORAGE | Secure storage compartment | SAID devices, implementations and modules for secure delivery and storage of mail, documents and packages include retrofit solutions for existing mailboxes, such as for example e.g. those illustrated in FIG. 6-9, self-contained complete SAID implementations as shown e.g. in FIG. 10-11, and attachments that will mount on and connect to an SAID station such as examples e.g. shown in FIG. 14, 17, 18. |
| (7) | SOFTWARE | SAID Firmware, Software, Distributed Software and/or a Distributed Application | Firmware e.g. initiates programmed SAID response to local sensor in SAID station such as daylight sensor, proximity. Software e.g. initiates programmed SAID response based on input from device external to an SAID station. Distributed Software and/or Distributed Applications e.g. SAID responses determined by interaction between software elements located in different parts of an SAID system, including remote computers, servers and the cloud. All Software is considered to be an active element of an SAID system. |
| (7) | SOFTWARE | SAID Distributed Software Service Applications | Distributed Software Service Applications are Distributed Software and/or Applications that enable an SAID system to provide a continuous service, which may generate recurring revenue from system operation. For example e.g. elder monitoring, tamper detection, security and fire alarm monitoring, facial recognition, archiving of: video, access attempts, mail deliveries, weather conditions, emergency alerts and other data generated by an SAID system. |
| (8) | ACCESSORY DEVICES | SAID Accessory Device | An SAID Accessory device is an active element in an SAID system that interacts or interoperates with at least other SAID device, either through a direct connection or over a network. An SAID Accessory device may be packaged in any SAID module, in a dedicated SAID Accessories module, or may operate from a location remote from an SAID station. SAID Accessory devices include such SAID system active elements as for example e.g. a condition signal device; remote control alert device, sensor, timer, transceiver, auto-dialer, actuator, home or building automation hub, network gateway, smart meter, soil condition sensor, smart phone-computer-tablet, connected smart watch, health monitor, entry beam detector, water level detector, and/or a combination of SAID active elements referenced in this application and the figures included herewith. When a remote network transmitter, such as e.g. a cell tower, satellite or TV/cable transmitter sends a message received by an SAID Accessory device, that transmitter is also considered to be an active element in an SAID system for that communication.<br><br>An SAID Accessory device further includes output-only Accessory devices activated by an SAID message, such as e.g. a flasher, beacon, strobe, audio device, tone generator, RGBW spotlight, siren and/or a combination of SAID output-only active devices and/or Accessory devices … The essential requirement for an SAID Accessory device is that it must generate a message that is communicated to /from and/or received by/from a second SAID device or an active element in an SAID system. |
| (9) | NETWORK | SAID Network | An SAID Network is broadly defined in this application as any connection between a first SAID device and a second SAID device that enables communication and interoperation between them. Thus any wired or wireless connection is considered to be a network, from a trace on a PC board or a hard-wired LAN to an RF, PLC, light, microwave or particle beam interconnection. An SAID network may require the use of a Transceiver or gateway on each end of the network to enable communication between disparate network types. An architecture connecting disparate networks is referred to herein as an Integrated Network. Networks are more fully described in the specifications and drawings. |

FIG. 2    INDEX OF DEVICES AND SYMBOLS – Selected examples of some but not all participants in SAID network

| Symbol | Name | Function | | Name | Function |
|---|---|---|---|---|---|
| | Satellite Transceiver | Long range Short messages and GPS | | Alert Bracelet | Personal short range remote alert |
| | Transceiver | Send, receive or modify over a wired, wireless or integrated communication link | | Remote Alert Panel/Control | Portable of wall-mounted short range remote alert |
| | Small Wind Generator | Convert wind to electricity | | Cell phone | Cell phone with optional SAID app |
| | Mailbox | Secure enclosure for delivery of Mail, Documents and packages | | SAID Station | Implementation containing SAID modules |
| | PV Battery | Convert sunlight to electricity and store | | Communications Tower | Cell tower, microwave, LoRA, WiFi or other medium range wireless communications |
| | Landline | Landline telephone | | | |
| | Daylight Sensor | Detect darkness to change light level | | 911 Dispatch | 911 Dispatch Center for First Responders |
| | Generic Sensor | An analog or digital sensor or timer | | Building Alarm | Building/Home/Location Alarm for Fire, Smoke, CO, AQM, Intrusion and other alarms |
| | Video Cam | Video camera with optional IR LED night vision | | | |
| | Motion Sensor | PIR, ultrasonic or other | | Building Network | Building/Home/Factory connected Automation system |
| | Medical monitor alert | Patient monitor alert to medical personnel and/or caregiver | | Street light & post | Roadway and path lighting poles and equipment |

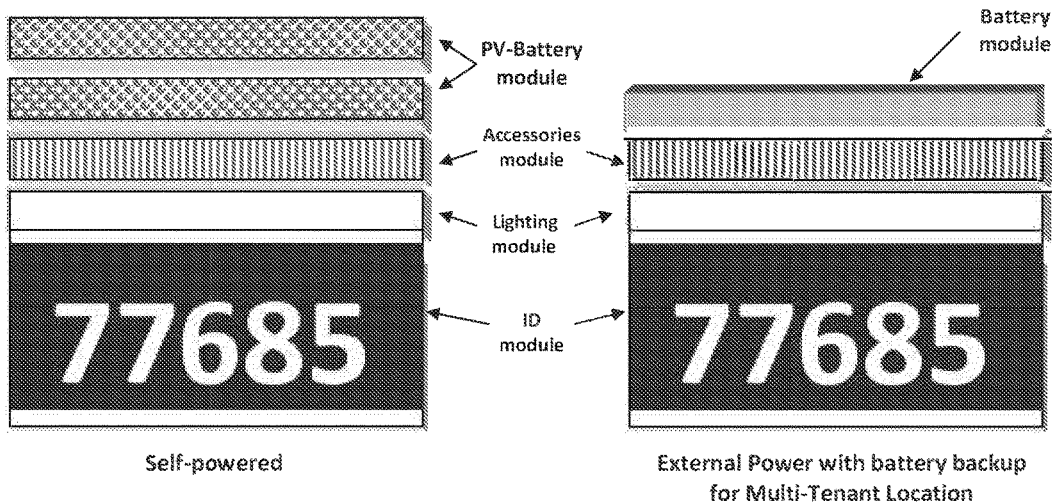
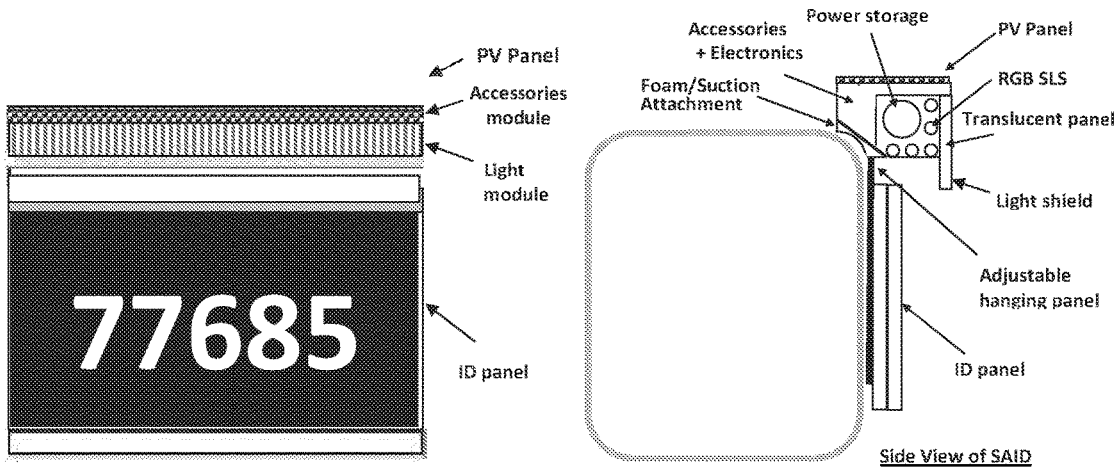

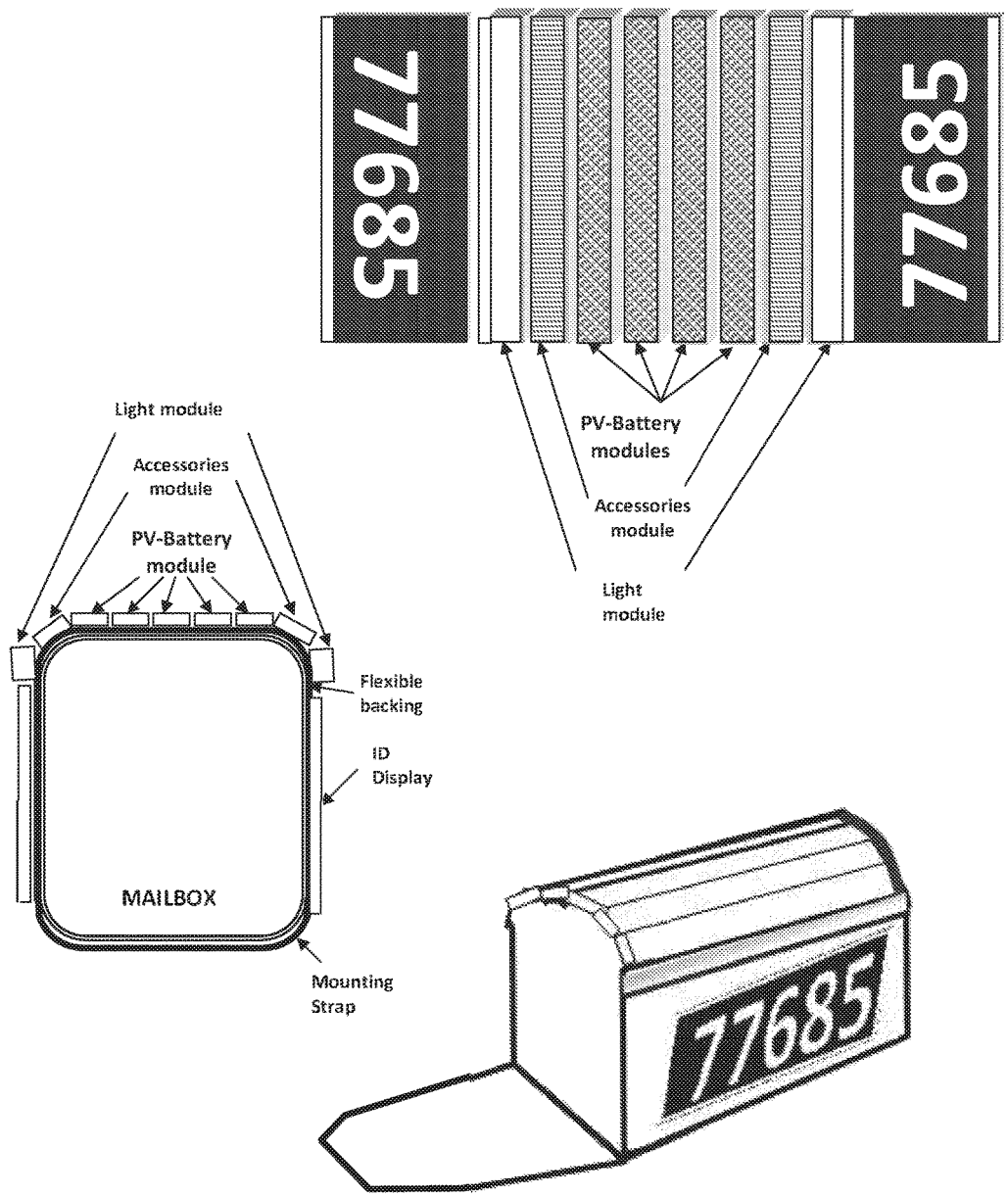
FIG. 9 DUAL SAID ASSEMBLY FOR TWO-SIDED MAILBOX RETROFIT

FIG. 12  Stand-alone SAID station with Solar-Battery, Lighting module, ID display and Accessories module

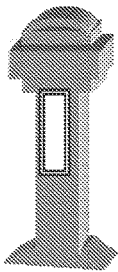

FIG. 13  EMBODIMENT IN PEDESTAL ENCLOSURE WITH ACCESSORIES AND WATER SENSOR

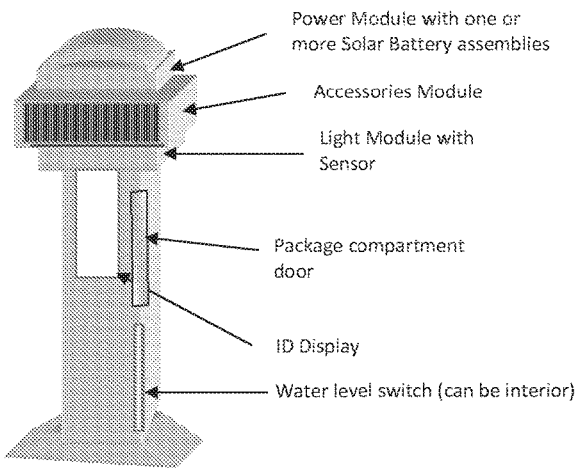

- Power Module with one or more Solar Battery assemblies
- Accessories Module
- Light Module with Sensor
- Package compartment door
- ID Display
- Water level switch (can be interior)

FIG. 14  EMBODIMENTS IN PEDESTAL ENCLOSURE

Stacked Power and Accessories Modules connected to internal vertical power bus

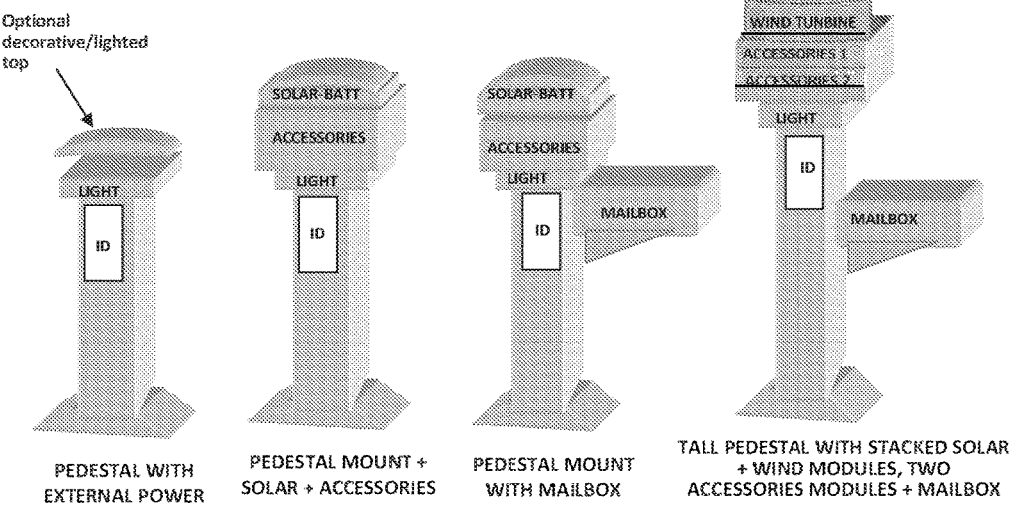

Optional decorative/lighted top

PEDESTAL WITH EXTERNAL POWER

PEDESTAL MOUNT + SOLAR + ACCESSORIES

PEDESTAL MOUNT WITH MAILBOX

TALL PEDESTAL WITH STACKED SOLAR + WIND MODULES, TWO ACCESSORIES MODULES + MAILBOX

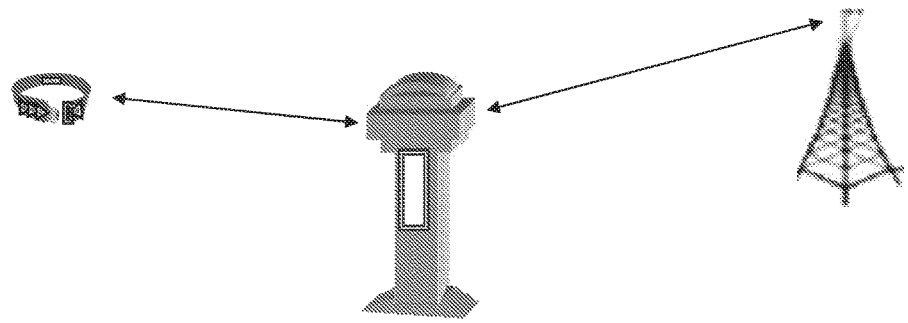
FIG. 15  Fixed-location SAID station with transceiver linked to user Alert bracelet and communications tower
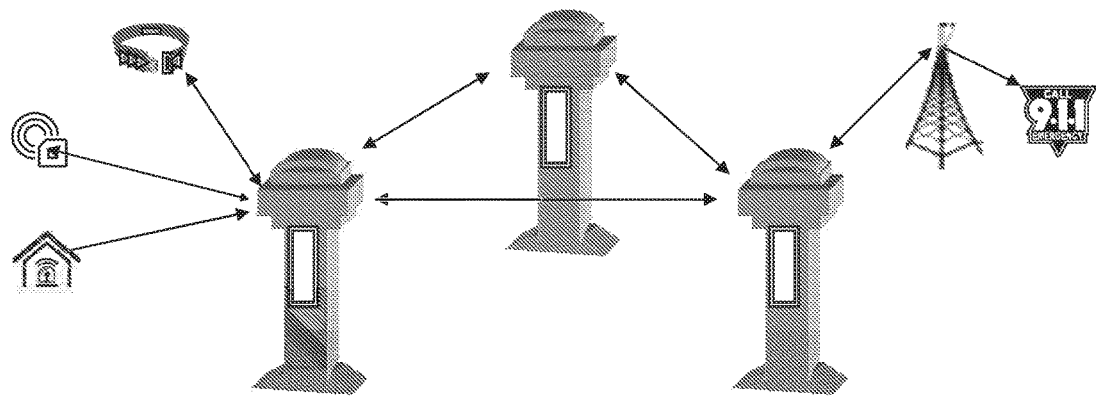
FIG. 16
SAID network with transceiver linked to user Alert bracelet, communications tower and other SAID devices
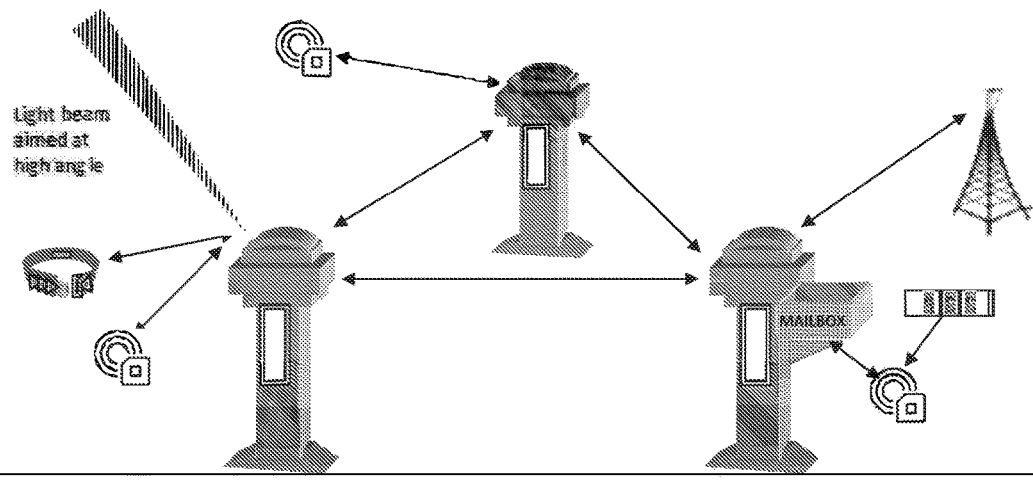
FIG. 17  SAID System - multiple units linked to user Alert bracelet, ID bracelet, scanner, sensors and communications tower

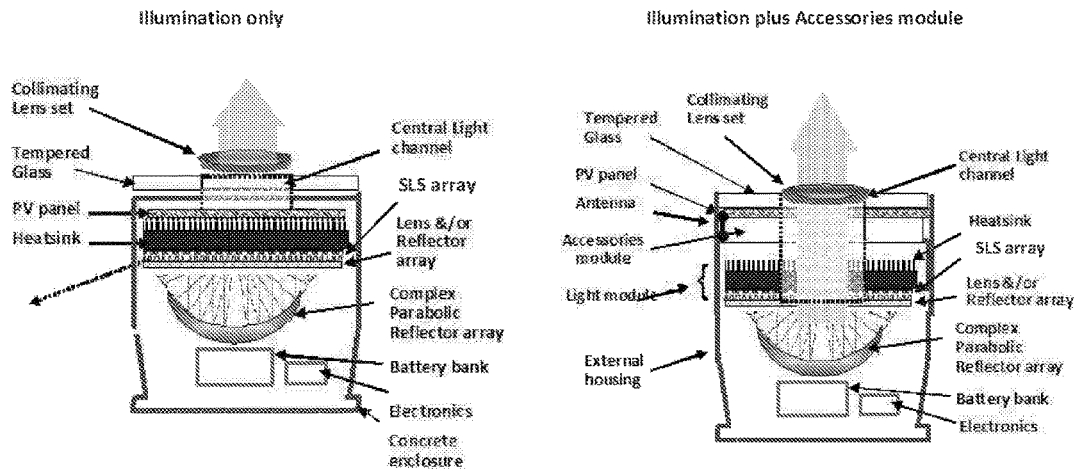

FIG. 19  EMBODIMENT IN A SOLAR ARCHITECTURAL LIGHTING FIXTURE
Example e.g. above-ground or In-Ground mounting

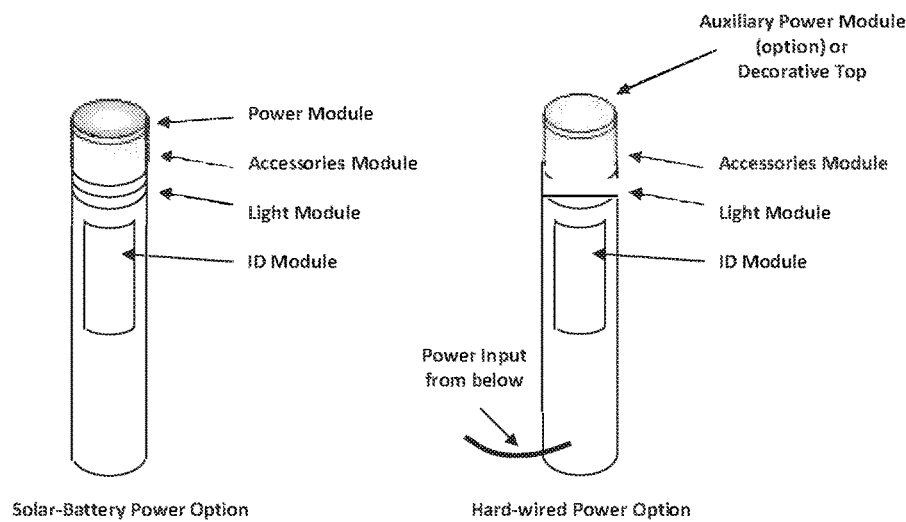

FIG. 20 A  COLUMNAR EMBODIMENT – ARCHITECTURAL BOLLARD IMPLEMENTATION

Implementation typically used for Path or Area Light in an architectural installation, but SAID station can also include "blue light" emergency functions, e.g. siren and dispatch of alert to a local security office via wifi or other channels.

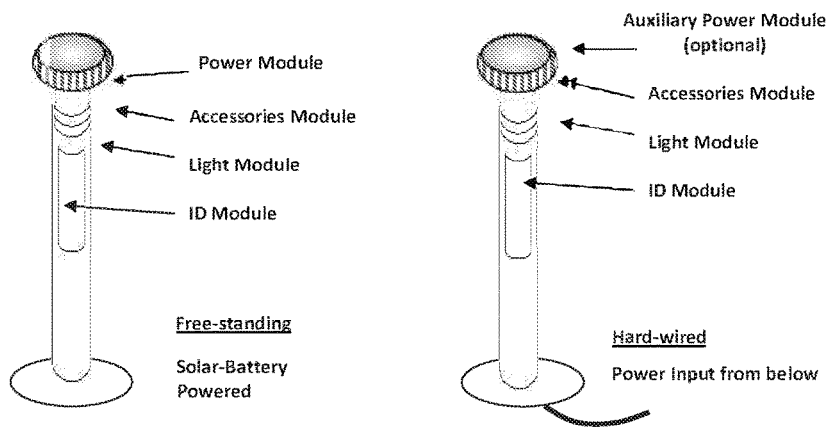

FIG. 20 B    COLUMNAR EMBODIMENT - BICYCLE-LANE DIVIDER IMPLEMENTATION

Normally dim. Can receive signal from approaching bicycle and will pulse or strobe in a pre-programmed progressive series to indicate bicycle and direction. Can also send an alert warning to nearby vehicles.

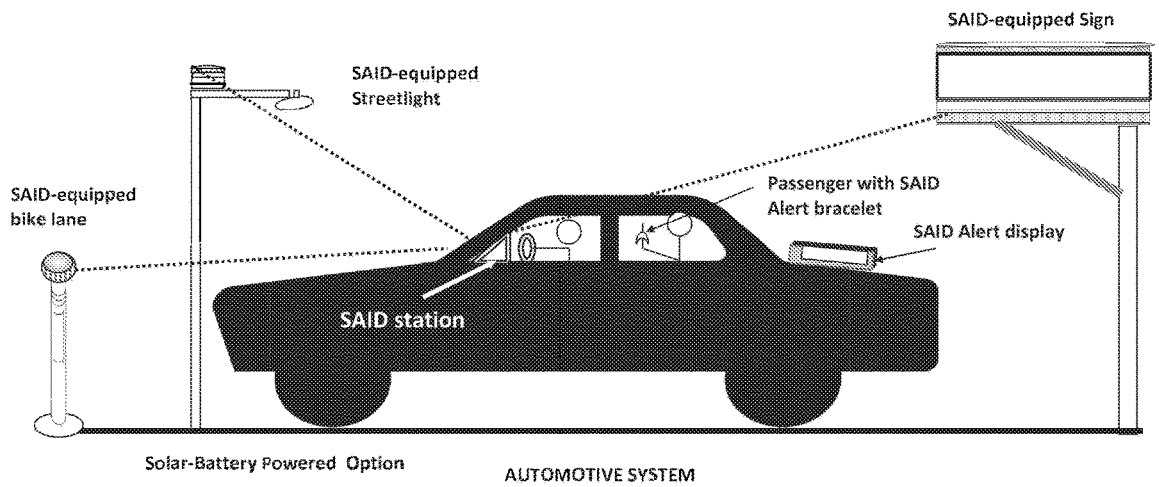

FIG. 21    EMBODIMENT OF MOBILE SAID SYSTEM ON A VEHICLE

Can receive signals from nearby Bicycle-Lane dividers alerting to nearby bicycle riders.
Can also receive alerts from communicating SAID-equipped Road signs.

FIG. 22    EMBODIMENTS OF MULTI-LAYER SAID ADDRESS ID DISPLAYS

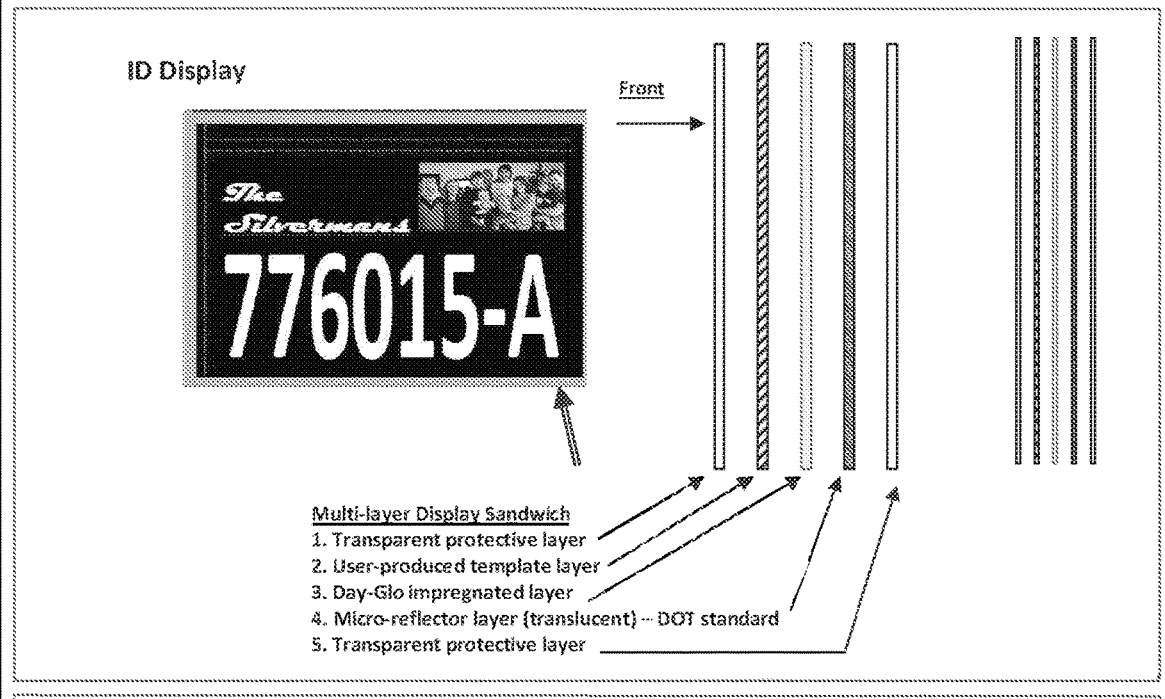

ID Display

Multi-layer Display Sandwich
1. Transparent protective layer
2. User-produced template layer
3. Day-Glo impregnated layer
4. Micro-reflector layer (translucent) – DOT standard
5. Transparent protective layer

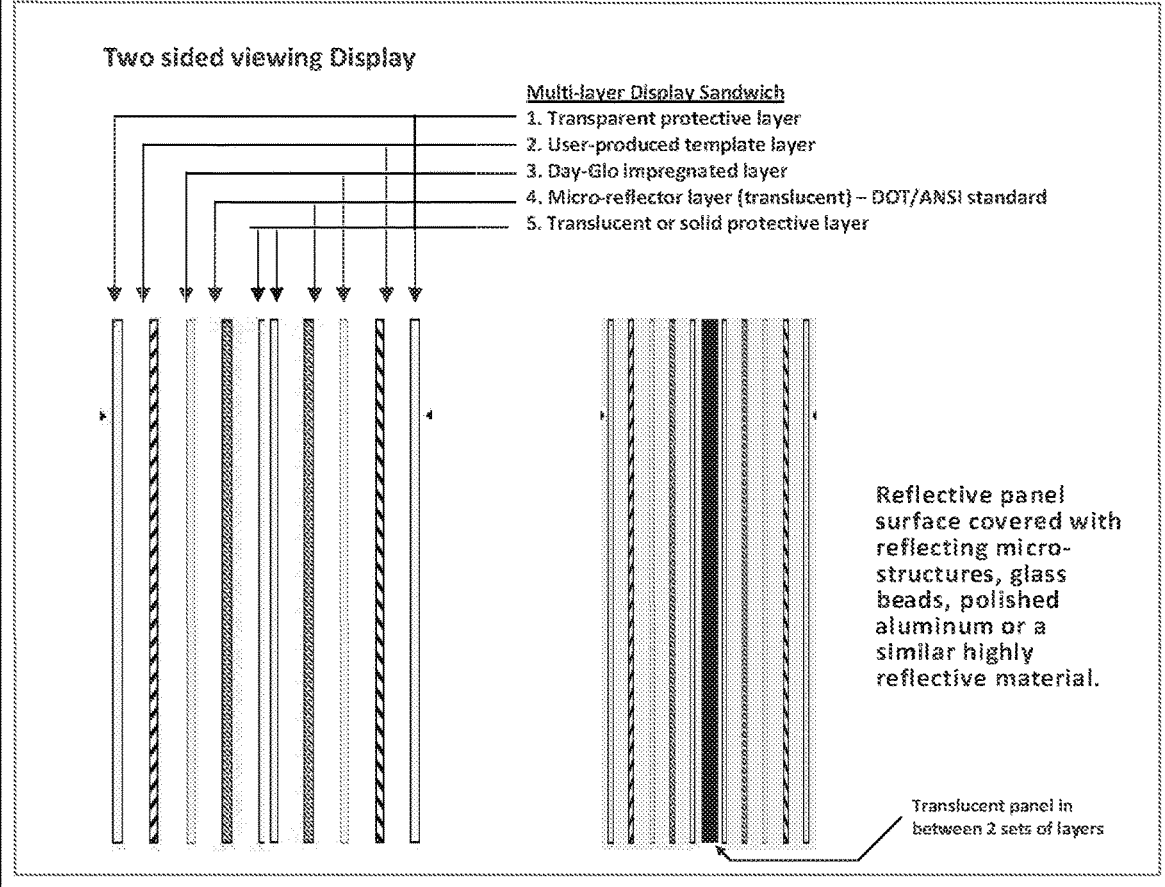

Two sided viewing Display

Multi-layer Display Sandwich
1. Transparent protective layer
2. User-produced template layer
3. Day-Glo impregnated layer
4. Micro-reflector layer (translucent) – DOT/ANSI standard
5. Translucent or solid protective layer Reflective panel surface covered with reflecting micro-structures, glass beads, polished aluminum or a similar highly reflective material.

Translucent panel in between 2 sets of layers

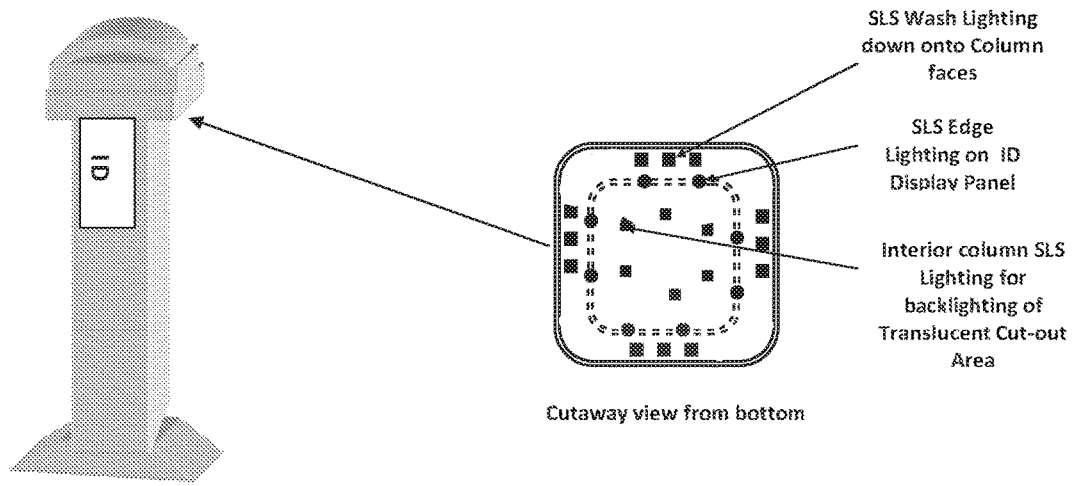
FIG. 23   EMBODIMENT OF AN SAID LIGHT MODULE
providing front lighting, edge lighting and backlighting
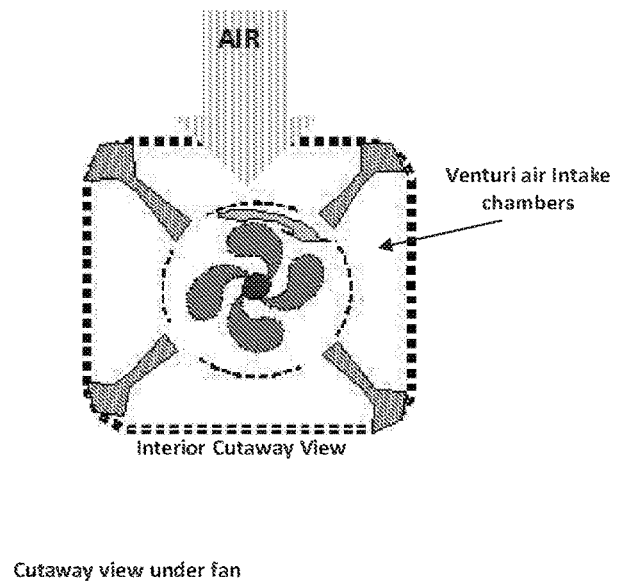
FIG. 24   EMBODIMENT OF AN SAID WIND GENERATOR POWER MODULE

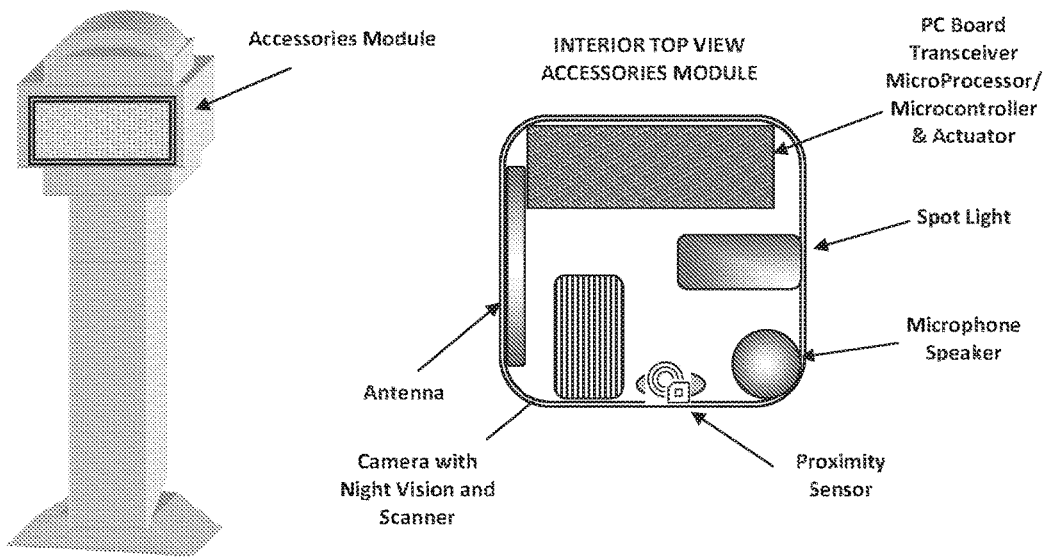
FIG. 25 SAID EMBODIMENT WITH ACCESSORIES MODULE AND INTERNAL DEVICES
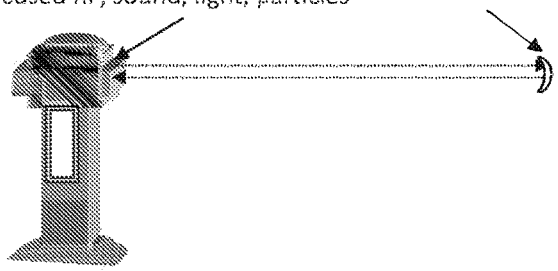
FIG. 26 EMBODIMENTS OF BEAM INTRUSION DETECTORS
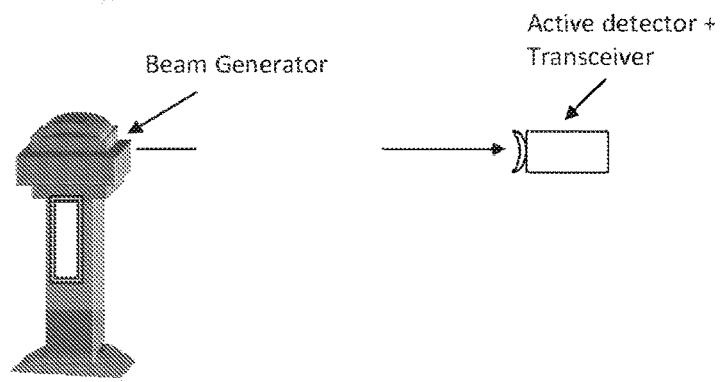

FIG. 27  Emergency Devices powered by human activity to provide energy to operate an SAID communications device – in the event of power failure, devices including but not limited to cranks on a phone, treadles, foot pumps or bicycle mechanisms with one or more gears are used, coupled with a small power generation device and optional energy storage cells to enable connection to a wired, wireless or integrated network for emergency communications or alerts.

FOOT-PUMP BELLOWS GENERATORS

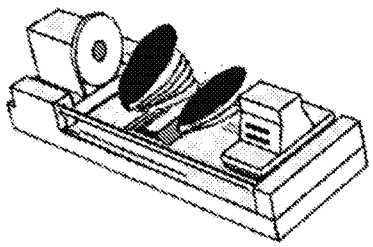

PEDAL-POWERED GENERATORS

PHONE with HAND-CRANK GENERATOR

ROTARY BICYCLE SEATED PEDAL-POWERED GENERATOR with battery storage

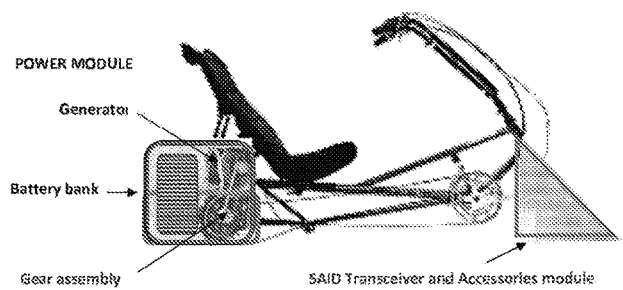

POWER MODULE
Generator
Battery bank
Gear assembly
SAID Transceiver and Accessories module

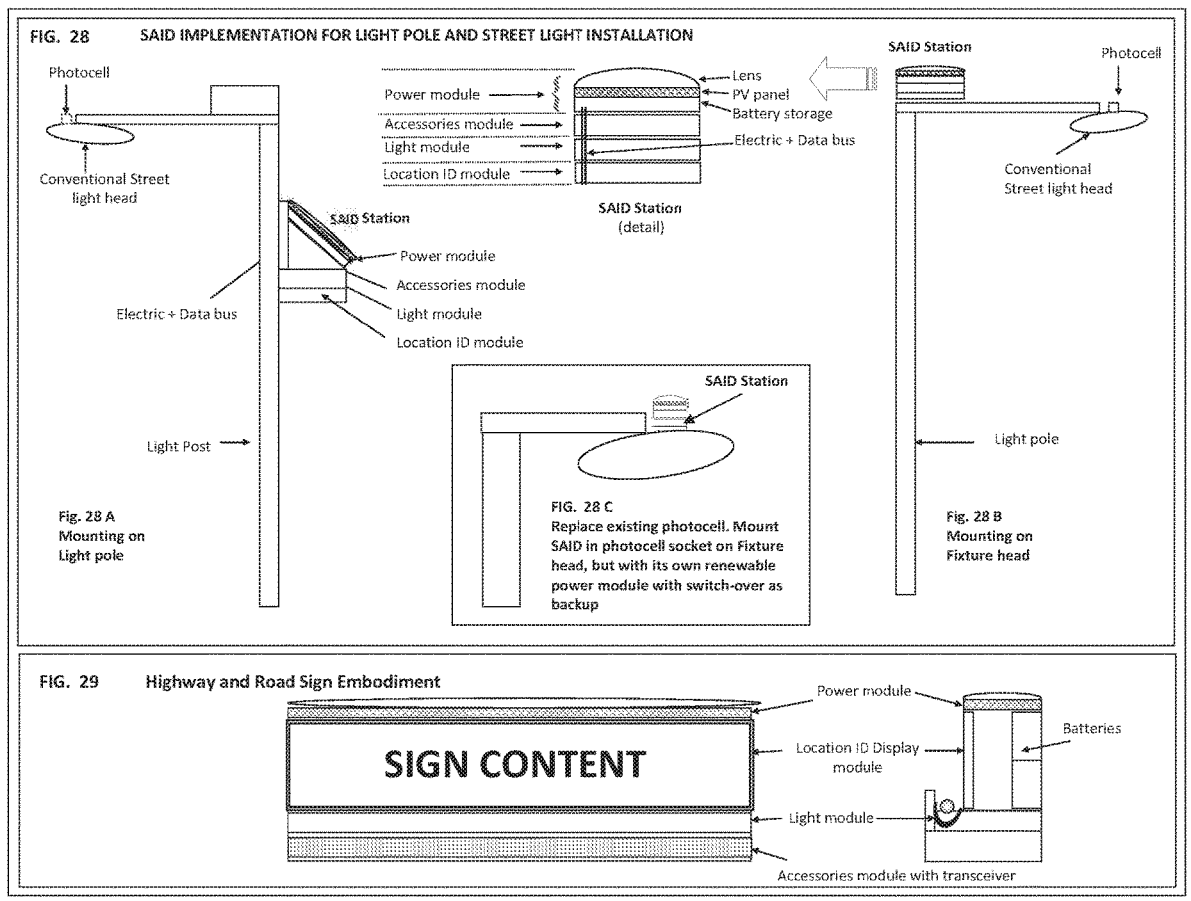

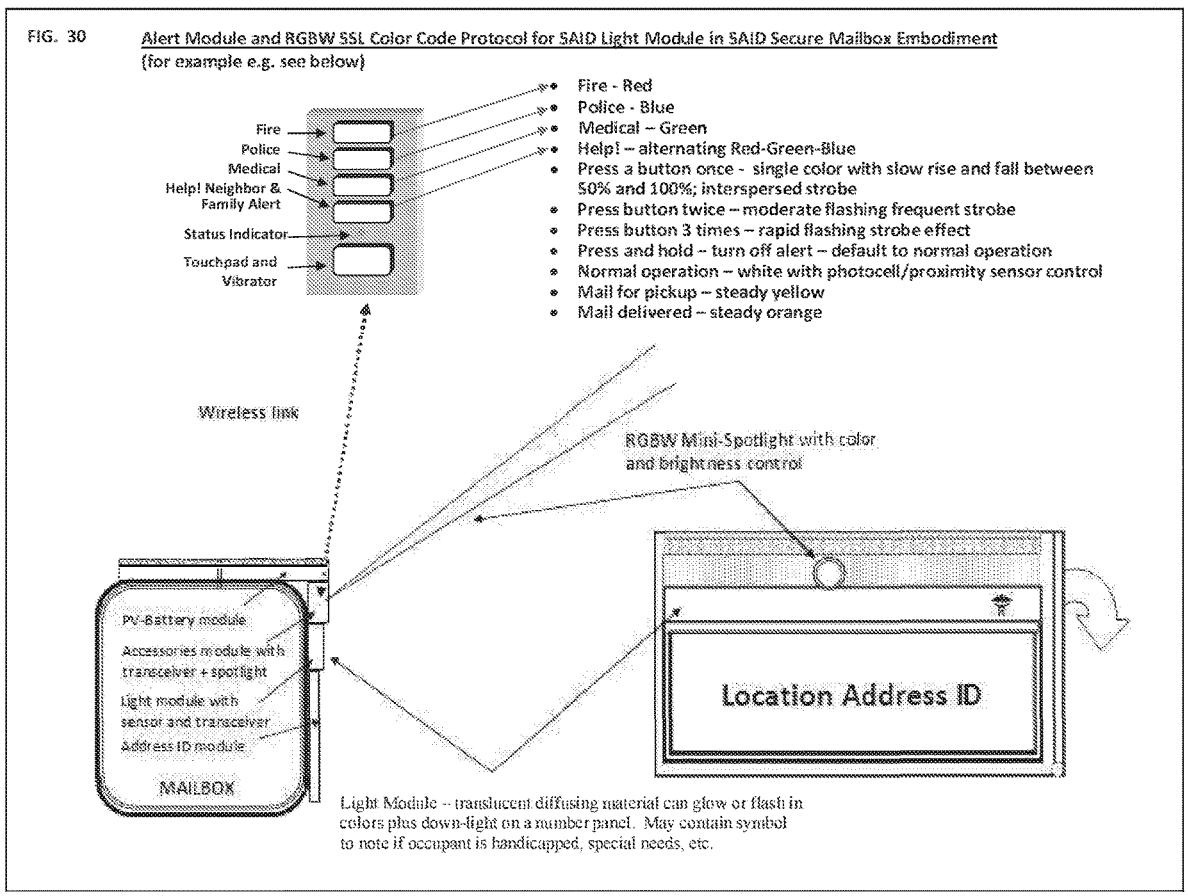

Representative examples of "Generic Sensor" communicating devices and Sensors p. 1

1. Biosensors
   - Biochip
   - Pulse-Ox sensor
   - Heart rate
   - Blood Pressure
   - $CO^2$ level
   - Breathing Detector (for search & rescue)
   - Eye motion sensor
   - Larynx movement sensor
   - Haptic sensor
   - Gesture sensor (sign language)
   - Iris recognition sensor
   - Voice recognition
   - Facial recognition
   - Tongue print reader
   - Fingerprint reader
   - Skin Conductance
   - Skin color analyzer
   - Voice recognition
   - Voice stress analysis
   - Vibration pad
   - TENS stimulator
   - Capacitance sensor
2. Acoustic, sound, vibration
   - Geophone
   - Hydrophone
   - Gunshot sensor
   - Underwater microphone
   - Microphone
   - Seismometer
   - Vibration sensor
3. Automotive, transportation
   - Air flow meter
   - Blind spot monitor
   - Driver alertness sensor
   - Engine coolant temperature sensor
   - Hall effect sensor
   - OBD code reader
   - Oxygen sensor
   - Parking sensors
   - Radar gun sensor
   - Speedometer
   - Water sensor
3. Chemical
   - Breathalyzer
   - Carbon dioxide sensor
   - Carbon monoxide detector
   - Electrochemical gas sensor
   - Electronic nose
   - Fluorescence sensors
   - Gas meter
   - Holographic sensor
   - Hydrogen sensor
   - Hydrogen sulfide sensor
   - Infrared point sensor
   - Nondispersive infrared sensor
   - Microwave chemistry sensor
   - Nitrogen oxide sensor
   - Olfactometer
   - Oxygen sensor
- Ozone sensor
- Particulate sensor
- pH glass electrode
- Potentiometric sensor
- Redox sensor
- Smoke detector 4. Electric current, potential, magnetic, RF
   - Current sensor
   - Stored Energy sensor
   - Electric meter
   - Electron multiplier
   - Galvanometer
   - Hall effect sensor
   - Magnetometer
   - MEMS magnetic field sensor
   - Metal detector
   - Planar Hall sensor
   - Radio direction finder and signal strength sensor
   - Voltage detector
5. Environment, weather, moisture, humidity
   - Actinometer
   - Aethelometer (Air pollution sensor)
   - Bedwetting or diaper moisture sensor
   - Dew warning
   - Electrochemical gas sensor
   - Fish counter
   - Frequency domain sensor
   - Gas detector
   - Humistor
   - Hygrometer
   - Leaf sensor
   - Lysimeter
   - Pyranometer
   - Pyrgeometer
   - Psychrometer
   - Rain gauge
   - Rain sensor
   - Seismometers
   - Snow gauge
   - Soil moisture sensor
   - Soil pH sensor
   - Stream gauge
   - Tide gauge
   - Water level sensor
6. Flow and fluids
   - Air flow meter
   - Anemometer
   - Flow sensor
   - Gas meter
   - Mass flow sensor
   - Water meter
7. Ionizing radiation, subatomic particles
   - Geiger counter
   - Neutron detection
   - Radon detector
   - Semiconductor detector
   - Thermoluminescent dosimeter

FIG 32A

Representative examples of "Generic Sensor" communicating devices and Sensors – p. 2

8. Navigation
   - Air speed indicator
   - Altimeter
   - Attitude indicator
   - Depth gauge
   - Gyroscope
   - Magnetic compass
   - Vibrating structure gyroscope 9. Position, angle, distance, speed, acceleration
   - Accelerometer
   - Capacitive sensing
   - Flex sensor
   - Free fall sensor
   - Gyroscopic sensor
   - Impact sensor
   - Inclinometer
   - Piezoelectric sensor
   - Laser rangefinder
   - Odometer
   - Photoelectric sensor
   - Piezoelectric accelerometer
   - Position sensor
   - Angular rate sensor
   - Shock detector
   - Tilt sensor 10. Optical, light, imaging, photonics
    - Charge-coupled device
    - CMOS sensor
    - Colorimeter
    - Contact image sensor
    - Electro-optical sensor
    - Flame detector
    - Infra-red sensor
    - LED as light sensor
    - Fiber optic sensors
    - Optical position sensor
    - Thermopile laser sensors
    - Photodetector
    - Photodiode
    - Photomultiplier
    - Phototransistor
    - Photoelectric sensor
    - Photoionization detector
    - Photoresistor
    - Photoswitch
    - Scintillometer
    - Transition edge sensor
    - Visible light photon counter
    - Wavefront sensor 11. Pressure
    - Barograph
    - Barometer
    - Ionization gauge
    - Oscillating U-tube
    - In-ground Pressure Gauge
    - Piezometer
    - Pressure sensor
    - Tactile sensor 12. Force, density, level
    - Hydrometer
    - Force gauge and Force Sensor
    - Level sensor
    - Load cell
    - Magnetic level gauge
    - Nuclear density gauge
    - Piezocapacitive pressure sensor
    - Piezoelectric sensor
    - Strain gauge
    - Torque sensor
    - Viscometer 13. Thermal, heat, temperature
    - Bimetallic strip
    - Calorimeter
    - Flame detection
    - Infrared thermometer
    - Microbolometer
    - Radiometer
    - Temperature sensor
    - Thermistor
    - Thermocouple
    - Thermometer
    - Pyrometer 14. Proximity, presence
    - Alarm sensor
    - Doppler radar
    - Motion detector
    - Occupancy sensor
    - Proximity sensor
    - Passive infrared sensor
    - Reed switch
    - Stud finder
    - Triangulation sensor
    - Touch switch
    - Wired glove
    - Dataglove

FIG. 32 B

Representative examples of "Generic Sensor" communicating devices and Sensors – p. 3

15. Other Sensors and Human Sensor Interfaces
    - Data Glove – wireless
    - Virtual Reality 3D display
    - VR Display through direct nerve or galvanic interface
    - VR Catadioptric sensor
    - Electromechanical film
    - Electro-optical sensor
    - Fatigue crack sensor
    - Fisheries acoustics
    - Image sensor
    - Inductive sensor
    - Lab-on-a-chip
    - Leaf sensor
    - Machine vision QR, RFID or Bar code
    - Photoelasticity
    - Radar
        - Ground-penetrating radar
        - Synthetic aperture radar
        - Radar tracker
    - Stretch sensor
    - Sonar
    - Transducer
    - Ultrasonic sensor
    - Video sensor
    - Wheatstone bridge
    - Wireless sensor network
    - Air pollution sensor
    - Image processing sensors
    - Sun sensor
    - Compressive sensing
    - Cryogenic particle detectors
    - Dew warning
    - Dichroic Light Filters
    - Diffusion tensor imaging
    - Electronic tongue
    - Fine Guidance Sensor
    - Functional magnetic resonance imaging
    - Glass break detector
    - IRIS (Biosensor), Interferometric Reflectance Imaging Sensor
    - Laser beam profiler
    - Millimeter wave scanner
    - Nuclear Magnetic Resonance imaging
    - Molecular sensor
    - Nanosensor
    - Omnidirectional camera
    - Organoleptic sensors
    - Optical coherence tomography
    - Polygraph Analyzer
    - Positron emission tomography
    - Range imaging
    - Scanning electron microscope
    - Smartdust
    - SQUID, Superconducting quantum interference device
    - SSIES, Special Sensors-Ions, Electrons, and Scintillation thermal plasma analysis package
    - Structured-light 3D scanner

- Timer/Time clock
- Ground Condition Sensors
    - Humidity
    - Nutrient levels
    - Temperature
    - Measuring solar spectral penetration

FIG. 32 C

SMART ADDRESS IDENTIFICATION AND SECURE MAILBOX

CROSS-REFERENCE TO RELATED APPLICATIONS

This application claims the benefit of U.S. Provisional Patent Application No. 62/655,954, filed on Apr. 11, 2018, entitled "SMART ADDRESS IDENTIFICATION AND SECURE MAILBOX," which is incorporated herein by reference in its entirety.

FIELD OF THE INVENTION

The present application relates to an improved system, apparatus, and method for numbering and identifying houses, buildings, equipment, vehicles, paths and other locations, that provides a more effective, secure and reliable interface between a location/occupant and those outside seeking to locate them or to make a secure delivery, including, for example, emergency first responders, postal and package delivery service providers, visitors and individuals unfamiliar with an area.

The present application further relates to a system, apparatus, and method to generate, receive, and communicate information. The system is designed to operate and respond in everyday use as well as a critical emergency. The invention involves an integrated network of wired and wireless communication connecting a neighborhood, a city, a town, and/or an isolated rural home site or location.

BACKGROUND

Identification of a location, information as to whether or not that location is occupied, and the physical condition of any occupants, can be extremely time-critical in emergency situations. An emergency notification and response system generally referred to as the "911 System" has been established in many areas of the U.S. to enable a person or auto dialer to dial 911 on a telephone in order to connect to an emergency response center and to request assistance from a 911 dispatcher. The existing 911 emergency response system has well-defined guidelines for the transmission, handling, and management of such calls, as well as dedicated frequency allocations for first responders.

At present, however, the ability to identify the exact end-point location of the endpoint of an emergency event from a call alone is generally possible only if a location is served by landline telephone service, due to the fixed location of such a connection. In an effort to integrate mobile phones and portable devices into the 911 system, new methods of location are being developed that calculate a mobile phone's location using algorithms to measure signal strength between transmission towers and triangulate device location. Mobile devices that contain GPS transceivers can provide similar location information. But these new approaches are not widely deployed. And all systems, old and new, suffer from the universal limitation that in order for a 911 dispatcher to assess an appropriate response to an emergency alert, a caller must be able to verbally provide their condition and the nature of the emergency to a dispatcher.

If a user is unable to speak or has other difficulty in communicating, a 911 dispatcher may not be able to ascertain critical details of an emergency, and is thus unable to initiate an optimal response, for example whether to send police, fire, medical or other personnel, along with specialized equipment that should accompany them.

Another problem is a lack of consistent nationwide 911 address identification guidelines or regulations. Where they do exist, it is generally only on a local basis. Regulations vary widely from one community to another, and are reportedly rarely enforced. While local codes may require that a location be assigned a "911 Address", they often specify only that a 911 Address Identifier contain letters and/or numbers of a certain minimum size. However, these codes typically provide little or no guidance on lighting or reflectivity for visibility at night, location on the property, or other specifications that assure visibility of the 911 address under highly variable emergency conditions.

A further limitation of existing methods that provide alpha-numeric address identification is that most are delivered as a DIY "kit" with several copies of each and every letter and number, to enable a user to choose and assemble their particular address using the copies of the characters contained in the kit. The characters are of fixed size, which may not meet the requirements of local codes, and the characters often must be mounted in a frame that limits the number of characters that may be installed. Sometimes as many as 50 characters are included in a kit even though the user may only need 7 or 8. The kit may contain too many of a given character and too few of another, resulting in waste of the unused characters and the need to order additional copies of any that are lacking. Custom-made signs are available but are expensive, require a long wait for fabrication and are not to any standard. The novel method of providing templates enabling a user to employ a computer to create an Address ID with the exact letters and numbers required eliminates waste and shortages inherent in previous solutions. In addition, the computer can be provided with links to local regulations to assure that the Address ID meets these requirements.

As a result of the lack of convenient, effective and consistent end-point location identification methods, it is not uncommon for first responders to arrive in the general vicinity of an emergency yet be unable to immediately find the precise location of the problem. When they do arrive at the scene, they may discover that they do not have the proper personnel or equipment to address that specific emergency. Delays resulting from these deficiencies are known to have contributed to many injuries and deaths, among both victims and first responders themselves.

Recent catastrophic fire, flood and other natural and/or man-made disasters have exposed another substantial weakness in the existing emergency response system: it is rendered almost entirely ineffective if a disaster event includes destruction of electrical power systems and/or communications infrastructure. This not only renders a 911 emergency response system inoperative, it can also disable local intrusion alarms and building security systems.

As major electric grid outages, frequent natural disasters and other catastrophic events become more serious concerns to people around the globe, it is essential to have an Emergency Communications System that can operate under virtually any conditions, on a local and a wide area basis. It is further clear that two-way communications is a requisite, since not only must an occupant be able to communicate with first responders, but authorities must be able to notify local citizens that they should take immediate action, including evacuation, to protect themselves in an emergency. This becomes especially difficult if electricity fails and access is impeded.

Another current problem is that, in the event of a fire or other emergency, many community fire stations use a loud siren that is activated as an alarm. The primary function of this siren is to summon fire personnel (often offsite volunteers) to come to the firehouse as quickly as possible for dispatch; it is generally not intended to alert other community members of potential danger.

Numerous studies have shown that the first defense of occupants during an emergency is their neighbors. A neighbor may be able to quickly stabilize an emergency situation until a properly skilled first response team arrives. While many neighborhoods around the US display "Neighborhood Watch" signs, in actuality, there is no effective neighborhood network that can actually implement such action.

Sirens may fail to operate if there is a grid power failure, substation fire, catastrophic weather event, natural disaster, or another disruptive emergency. Some local fire departments are replacing or augmenting existing sirens with direct communication to personnel via landline telephone, mobile phone, text, pager or email, or other electronic communications. But again, if information about the location and nature of the emergency is not available to the dispatcher for reasons discussed above, fire departments and other first responders may be unable to launch a fully effective and timely response.

Taken all together, it is clear that the critical link between first responders and persons or locations in an emergency is neither sufficiently secure nor adequately informative with present technology. There is an essential need for an emergency system that will reliably and securely interconnect people who need urgent help with first responders, municipal agencies and hospitals, neighbors and loved ones.

In a true emergency, a working system is indispensable to provide critical real-time information. It must enable and continue to support the rapid dispatch of emergency teams with the proper personnel and equipment needed for that specific type of emergency—whatever and wherever it might be. Thousands of lives and billions of dollars can be saved.

An effective emergency alert system must function properly and without interruption under virtually any conditions. It must provide critical information day or night, quickly and accurately. Where employed as a system serving a neighborhood or a city, the system must be able to reconfigure itself in the event that any of its elements is destroyed. It must maintain a history of events before, during and after a catastrophic event occurs. And, as has been illustrated by recent floods, wildfires and other natural disasters in Texas, Florida, California, Puerto Rico and in nations around the world, it must remain operational in a major emergency under extreme conditions without external electricity for as long as three days, that being the approximate period of time in which first responders must locate and rescue survivors and minimize loss of life.

Existing emergency systems are simply not designed for the type and scale of natural disasters and emergencies that nations have begun to experience more and more often—destructive hurricanes, catastrophic floods, wildfires, major mudslides, tornadoes, and terrorist attacks. In a major emergency, whether it affects one person, a community or an entire city, the systems that exist today on which we rely to summon help regularly stop working. And not just for a few hours; more often, power and communications can be down for days, weeks or even months, such as in a large and serious disaster event, such as Hurricane Katrina, Sandy or Harvey, wildfires throughout the Western US, droughts in Utah and Nevada, floods in New Orleans, Dallas and New York, massive landslides in California, Terrorist or deranged attacks on power stations and people.

These all point to the same unsolved problem—what to do when the power is out, communications are down, there's no internet, no alarm systems, no cell phone, no Wi-Fi, landline phone service, and limited physical access. First Responders do not know where people may be trapped and can be forced to spend precious hours in blind house-to-house searches in the hope of locating survivors.

The initial three-day period after a disaster is generally considered by first responders to be the window for "rescue" (of survivors); after that, an operation becomes "recovery" (of bodies).

Time is of the essence in locating survivors and determining their location and condition. Without electricity there may soon be no drinking water; without electricity there is no refrigeration and soon little or no food.

An emergency response system provided by the present application is of great economic and social value to citizens, governments, and emergency response authorities in the US and internationally.

Another serious and growing problem today is the steadily increasing theft of mail, packages, and documents. An October 2007 study stated that a mailbox presents an especially high risk for non-technological identity theft. The report analyzed U.S. Secret Service cases between 2000 and 2006 that had components of identity theft and identity fraud. It concluded that mail theft is one of the two most prevalent methods of non-technological identity theft.

According to the US Postal Inspection Service, stealing mail enables perpetrators to commit identity theft, alter payees and amounts on checks, steal credit cards and use other documents for illegal purposes. Such thefts often occur in the middle of the night, although packages left in front of houses are increasingly stolen during the daytime as well. Mechanical locks on mailboxes can be defeated using stolen or altered keys. And the steady increase in online buying of goods with drop-off delivery to customers is massively escalating the crisis.

The overall cost of theft, insurance payment, apprehension, prosecution, and incarceration of offenders runs into the hundreds of millions of dollars annually. In other words, an insecure mailbox can be a serious economic, personal, business, and societal threat.

A solution to this problem such as that provided by the present application is of great economic as well as social value.

SUMMARY OF THE INVENTION

A Smart Address Identification (SA-ID) and Secure Mailbox as described herein, is a system, apparatus, and method to provide one or more of the following capabilities, for example, to: (1) precisely identify a location, (2) generate, transmit and receive an emergency message, (3) reliably provide critical information to first-responders, (4) secure the delivery and retrieval of mail and packages, (5) validate and authorize access for service personnel, (6) control access and record entries, and (7) create a Neighborhood Network. At least one embodiment contains one or more transceivers intercommunicating with at least one physically separated transceiver, each with a unique identifier and interactively coupled to one or more sensing, signaling and monitoring devices installed at one or more local and/or remote locations. A transceiver will operate over an integrated wired and/or wireless network. At least one transceiver will receive, identify, and transmit information about conditions at a location, for example, data useful for an occupant, visitor, service personnel and first responder. At least one embodiment integrates the invention into a mailbox. At least one embodiment includes a watertight compartment and sealed component and connections enabling it to function underwater for extended periods of time.

Embodiments and application-specific implementations of the invention can generate and store renewable power, operate a wide variety of compatible accessory devices and provide an expandable architecture. An SA-ID embodiment can be equipped with compatible SA-ID accessory devices including but not limited to, e.g., a camera, light, microphone, siren, speaker, scanner, display, sensor, locations condition alert, and/or a sensor-actuator and/or alert response device. An SA-ID accessory device will enhance the basic function of an address location identification system as described herein. The SA-ID system will maintain operation under the most severe and critical environmental and emergency conditions.

Among embodiments and application-specific implementations described here and in the drawings, the invention includes at least one embodiment that is integrated into a mail box, an embodiment that can be attached as a retrofit to an existing mailbox, and/or an embodiment mounted to a mailbox support post. Each such embodiment provides additional new security for the delivery and storage of mail, documents, and packages.

BRIEF DESCRIPTION OF THE DRAWINGS

FIGS. 1(a) and 1(b) contain a table depicting an overview of selected SA-ID devices and modules that may be included in embodiments of the subject SA-ID invention and their associated functional descriptions.

FIG. 2 is a key to symbols used in the Figures to represent Names, Elements and Devices of SA-ID embodiments and systems FIGS. 3 and 4 contain drawings of selected embodiments of SA-ID user alert devices.

FIGS. 7, 8 and 9 depict selected embodiments of SA-ID secure mailbox implementations.

FIGS. 11-18 depict a selection of implementations of embodiments of SA-ID systems that include pedestal-mounted SA-ID stations.

FIG. 18 depicts a conceptual diagram of an embodiment of a broadly-distributed and diverse SA-ID system implemented over an integrated wide-area network including wired and wireless subnets.

FIG. 19 depicts an SA-ID embodiment packaged in an in-ground light-fixture as an illustration of a piece of lighting equipment that includes SA-ID devices.

FIGS. 20(a) and 20(b) illustrate similar configurations of columnar SA-ID embodiments that address different application-specific needs, demonstrating how one SA-ID embodiment may be adapted to differing applications through minor modifications in packaging and software.

FIG. 21 depicts a mobile embodiment of an SA-ID system in a vehicle that communicates with other SA-ID devices.

FIG. 22 depicts an SA-ID embodiment of a multi-layer visual Address Identification display.

FIG. 23 illustrates an SA-ID Light module designed to illuminate a visual SA-ID address ID display that includes front lighting, edge lighting and back lighting.

FIG. 24 illustrates an SA-ID Power module containing a wind generator.

FIG. 25 depicts an embodiment of an SA-ID Accessories module populated with a selection of compatible SA-ID accessory devices.

FIG. 26 depicts an SA-ID embodiment that provides intrusion detection using a beam interruption device.

FIG. 27 depicts a selection of human-operated power generators that may be included in an SA-ID embodiment.

FIG. 28 illustrates selected SA-ID embodiments for application-specific implementations for a Smart City.

FIG. 29 depicts an SA-ID embodiment of a smart road sign.

FIG. 30 depicts a handheld SA-ID Alert Module linked to an SA-ID Light Module in an SA-ID Secure Mailbox Implementation.

FIGS. 32A-C list examples of "generic sensors". One or more these sensors may be integrated into SA-ID embodiments and application-specific implementations. A generic sensor can be coupled with a transceiver, microcontroller and/or other electronics to enable communication in an SA-ID system.

DETAILED DESCRIPTION

Figure 3:
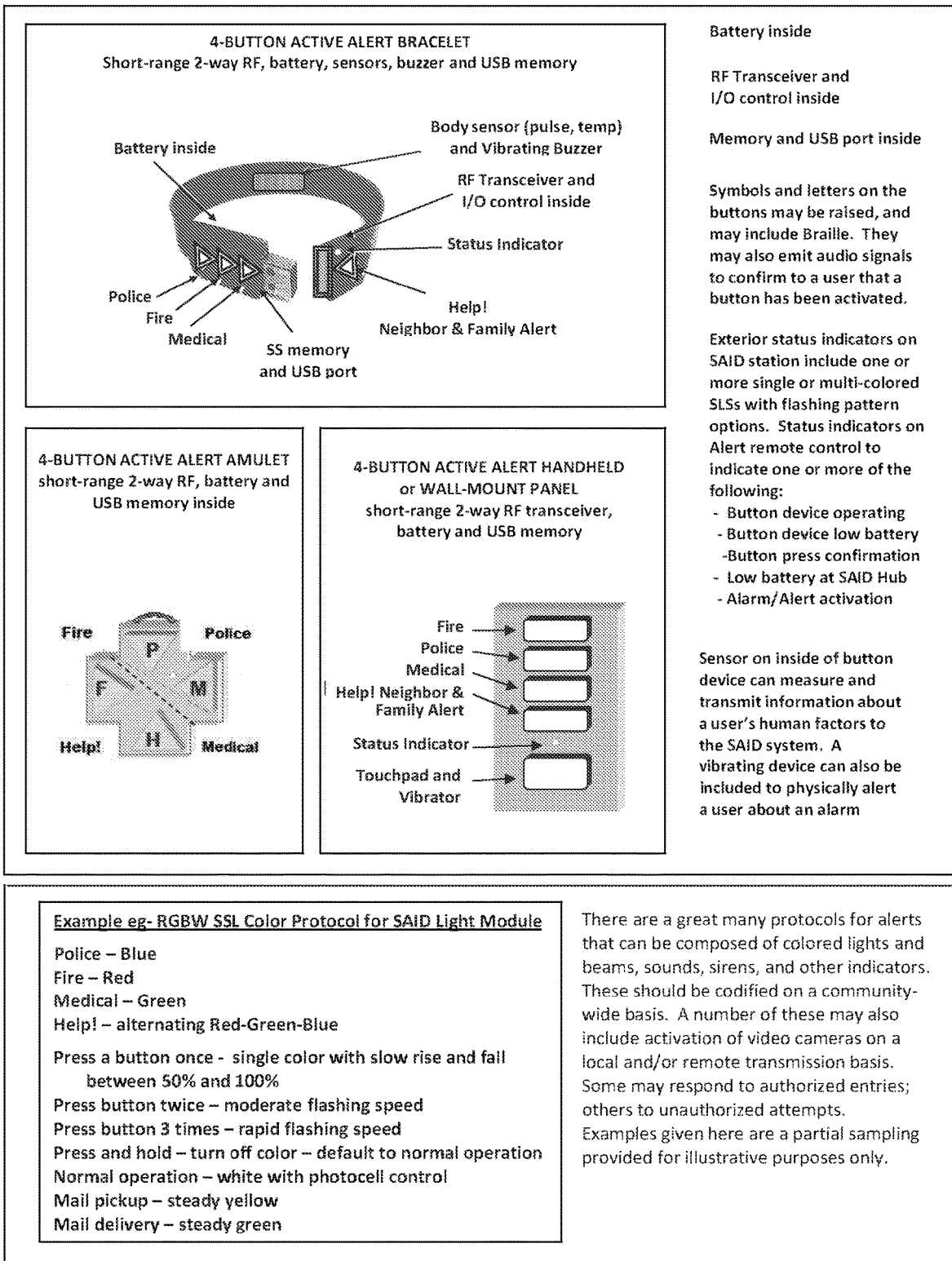

The present application is designed as an extensible platform that includes a multiplicity of interoperable elements, for example, devices, modules, functional aspects, enclosures, user remote control alert devices, software programs and communication networks and compatible transceivers. Some although not all of these interoperable elements illustrated in FIGS. 1A and 1B. These elements may be combined, removed, or reconfigured to create different embodiments or application specific implementations of the present application. A combination of such elements or embodiments to create a particular embodiment of the invention would be within the scope and possession of the invention and knowledge of the inventor or those skilled in the art, and is considered to be covered under the scope of the present disclosure.

Embodiments of the present application include one or more of a plurality of interconnected elements and compatible devices as described in the specifications and drawings, that interoperate in a variety of configurations including, but not limited to, those embodiments described herein, irrespective of the physical location of an element with respect to another element or its source of power. An implementation consisting of a set of two or more interoperating SA-ID elements is referred to in general terms herein as an embodiment of a Smart Address Identification (or "SA-ID") System.

Configuring an SA-ID system to include expansion devices, modules and software as described herein, enables an SA-ID system to provide many useful applications and services. The modular quick-connect architecture of an SA-ID system enables devices to share common elements of infrastructure, so that the collective functionality of an SA-ID system is delivered at a much lower cost than equivalent functions of a single-function system typical of today's approach, for example a security system, a system of telephones, an alert system, a fire detection system and others. Applications for SA-ID system embodiments include, but are not limited to, examples such as: emergency response, community communications, access control, elderly health monitoring, home and building automation, security monitoring, energy management, "demand response" and grid monitoring, emergency detection and responder notification, secure mail and parcel delivery, and other applications. Many of these are configured as application specific implementations of embodiments of an SA-ID system through the inclusion of specialized devices and/or customized software. The SA-ID system is uniquely designed so that upgrades and modifications may be implemented with minimal labor at any time.

As described in the present application, an embodiment of the SA-ID technology may serve a single isolated location, or may be expanded through the addition of one or more SA-ID-compatible devices and modules, such as a transceiver, secure mail module, camera or other SA-ID devices described herein, to implement a wide-area integrated SA-ID alert network and secure mail system that delivers a plurality of functions at multiple locations throughout a neighborhood, campus of buildings, a commercial, residential or mixed-use development, an entire community, municipality or city.

As described herein, elements of an SA-ID system include interoperable devices, modules, aspects, user remote control alert devices, software, and networks, some but not all of which are included as examples in FIG. 1. SA-ID Elements may be housed in a variety of enclosures, combinations, interconnections, and configurations that may vary in different embodiments and implementations but do not alter the underlying concept of an SA-ID system. The devices, elements, embodiments and application-specific applications disclosed herein as examples in the present patent application do not constitute an exclusive list, as there may be equivalent methods to accomplish an objective of a particular embodiment, and the decision to use such an equivalent method, should not be interpreted as causing a departure from the scope of the invention.

Functional Modules in Exemplary Embodiments of the Invention

An embodiment of an SA-ID system in the descriptions and figures herewith include, but are not limited to, a combination of at least two or more of the following interoperating active elements or embodiments. The embodiment and/or application-specific implementation of an embodiment that includes a set of interoperating active devices and which provides functionality equivalent to that of the invention described herein, irrespective of the manner in which it is housed or the components selected, is assumed to be covered under the claims of the invention.

(1) SA-ID Power Module—An SA-ID Power module refers to one or more devices that supply power to one or more active SA-ID elements in an SA-ID system. A power supply for an SA-ID system may be powered by renewable energy and power storage with charge control, and/or by a combination of renewable energy and power from a remote power source (such as an emergency generator or electrical mains). Renewable energy may be used as back-up to a remote power source, or conversely, the remote power source may be used to charge the energy storage if the renewable source is insufficient or fails. A remote power source may also operate an SA-ID system directly from a conventional electrical source, without a renewable supply, for example, an SA-ID station in the interior of a building. In this case, power storage may be installed to be used as emergency backup in the event that the remote power source should fail. While combination solar-battery modules do exist, almost all are designed for cell phone recharging, and therefore have only USB (5.5V) outputs. In addition, the batteries inside are soldered in, not mounted in a standard holder where they may be removed or exchanged. Other solar-battery chargers are custom-built for the product they come with, for example a laptop, and have connections and output specific to that product only.

By contrast, an SA-ID solar-battery module is designed with multiple outputs for general use with a multiplicity of electric and electronic devices. In addition, modules are designed to be dropped into devices in parallel for greater capacity, or in series for higher voltages. Inside an SA-ID solar battery module, standard battery holders are used so that an individual battery may be removed and exchanged. The PV layer of each battery may also be equipped with a focusing lens to capture a wider angle of sunlight, so that it will recharge more quickly than existing solutions. The exterior of the module power output area has multiple large, flat contact areas so that it does not need to be "plugged" into a product but may simply be dropped in and a fastener turned or snapped-in to hold it down. The voltage output pads are inverted images of each other so that the module may also be rotated in either direction by 180° and still be properly oriented. This facilitates rapid exchange even in darkness or smoke. Finally, the power modules are designed so that many may be dropped into a charging tray and either put out into the sun to recharge all at once, or plugged in to a power supply to recharge the entire group at one time. The power module is built in standardized format, has multiple voltage outputs, and enables a user to quickly exchange batteries. They may be put in the sun or plugged into a voltage adaptor, to conveniently recharge one or a group. Then in the evening, or when needed, the modules may be brought inside to be used, for example, to drop into lighting equipment for a hut or a barracks.

Thus, they are a much more useful and practical power solution than those products previously available battery packs for military use in the field, in rural areas or developing countries that lack reliable electricity, or as emergency power anywhere during an outage.

In at least one embodiment of an SA-ID system, an SA-ID Power Module will include at least one self-renewing energy generation device and at least one energy storage device that will operate together and are independent of external electricity or other remote power sources, for example, a solar-PV cell coupled to a power storage device such as for example, a battery and including a charge control device if needed.

An SA-ID Power module will supply and deliver power to one or more SA-ID devices for an extended period. At least one embodiment of an SA-ID Power module contains a power storage device. A self-renewing SA-ID Power may include a power storage module of sufficient capacity to operate one or more of a plurality of system devices incorporated into an SA-ID system, such as a CPU/microcontroller board and a Light module and/or an SA-ID Location ID module, for a specified minimum period of time.

In at least one embodiment, an SA-ID Power module will supply power to one accessory devices and modules such as, for example, a sensor (such as a daylight sensor, proximity sensor and/or water level sensor), camera, audio transducer (such as a microphone, siren and/or speaker), a spot-lighting device producing a narrow beam of high-intensity light. One or more of these accessory devices may be controlled by an actuator that is programmed to respond to one or more specific inputs from an SA-ID sensor, CPU/microcontroller, timer, or an SA-ID remote alert control signal.

At least one embodiment of an SA-ID system is equipped with a watertight enclosure that contains one or more encapsulated devices such as a power source (for example a Solar PV panel), circuit board and storage device (such as an encapsulated battery), enabling it to operate underwater in flood conditions.

Figure 18:
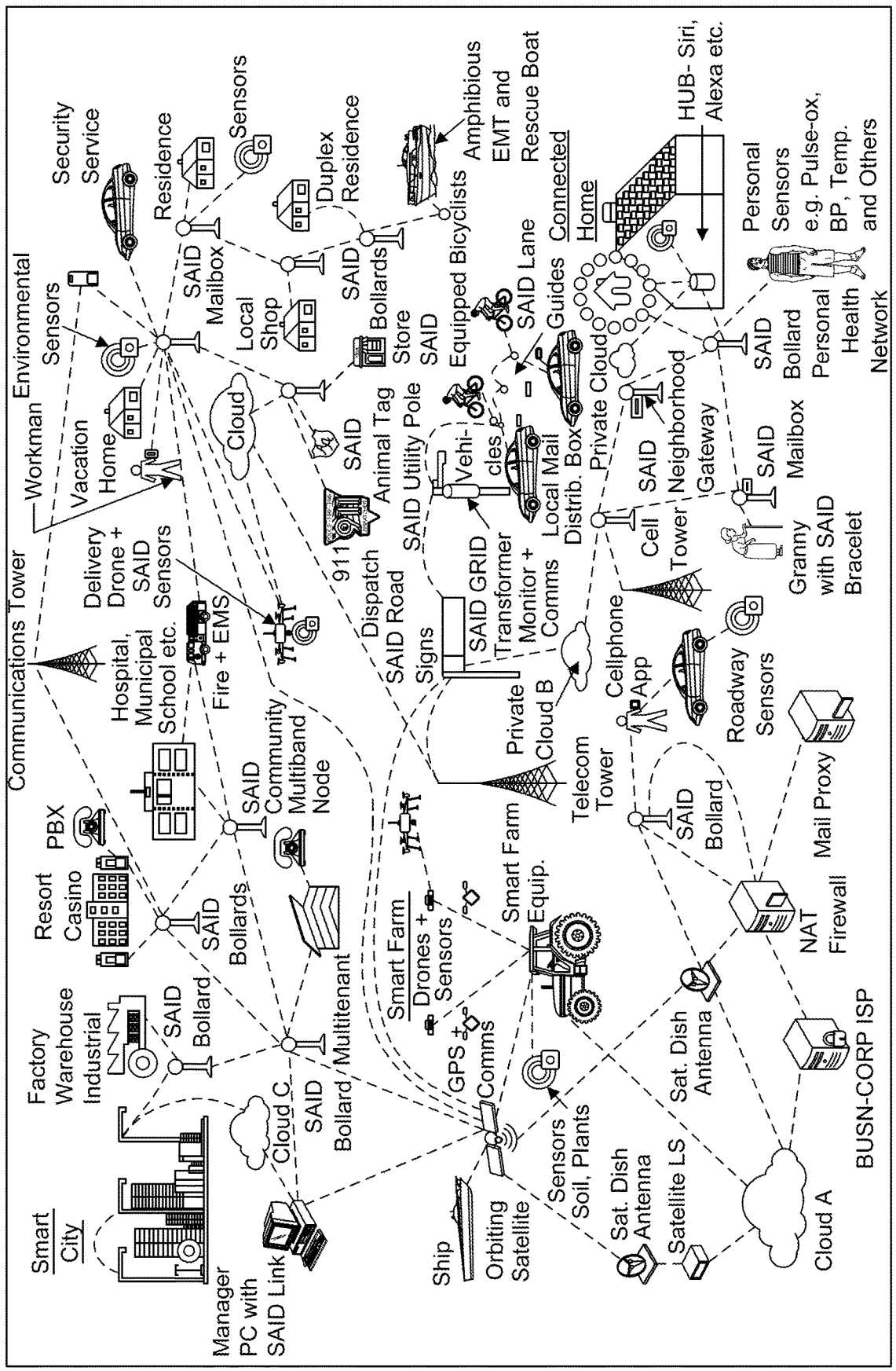
Figure 31:
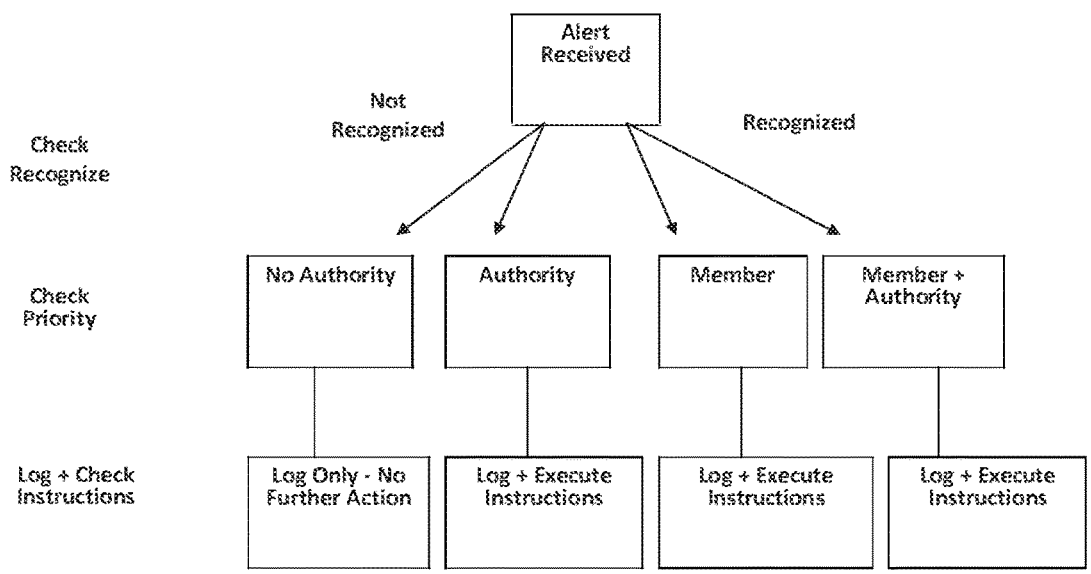
FIG. 31 illustrates one possible Member recognition sequence in a Community Network.

In at least one embodiment, a waterproof SA-ID power module will be connected to a water sensor and controller that causes a transducer to generate a series of low frequency (or "ultrasonic") codes that will propagate underwater. Communication by whales recorded in the 0.5 kHz-40 Hz range have validated the viability of this approach. For example, the frequency of killer whale whistles has been measured in ranges from about 0.5 to 40 kHz, with peak energy at 6 to 12 kHz. Underwater SA-ID messages may for example, use a simple messaging protocol such as a coded series of clicks, beeps, or tones to communicate information such as, e.g., location, conditions, and status of a location and/or an occupant. An emergency response vehicle equipped with an appropriate antenna and transceiver-amplifier array will be able to detect these signals as illustrated in FIG. 18.

Figure 5:
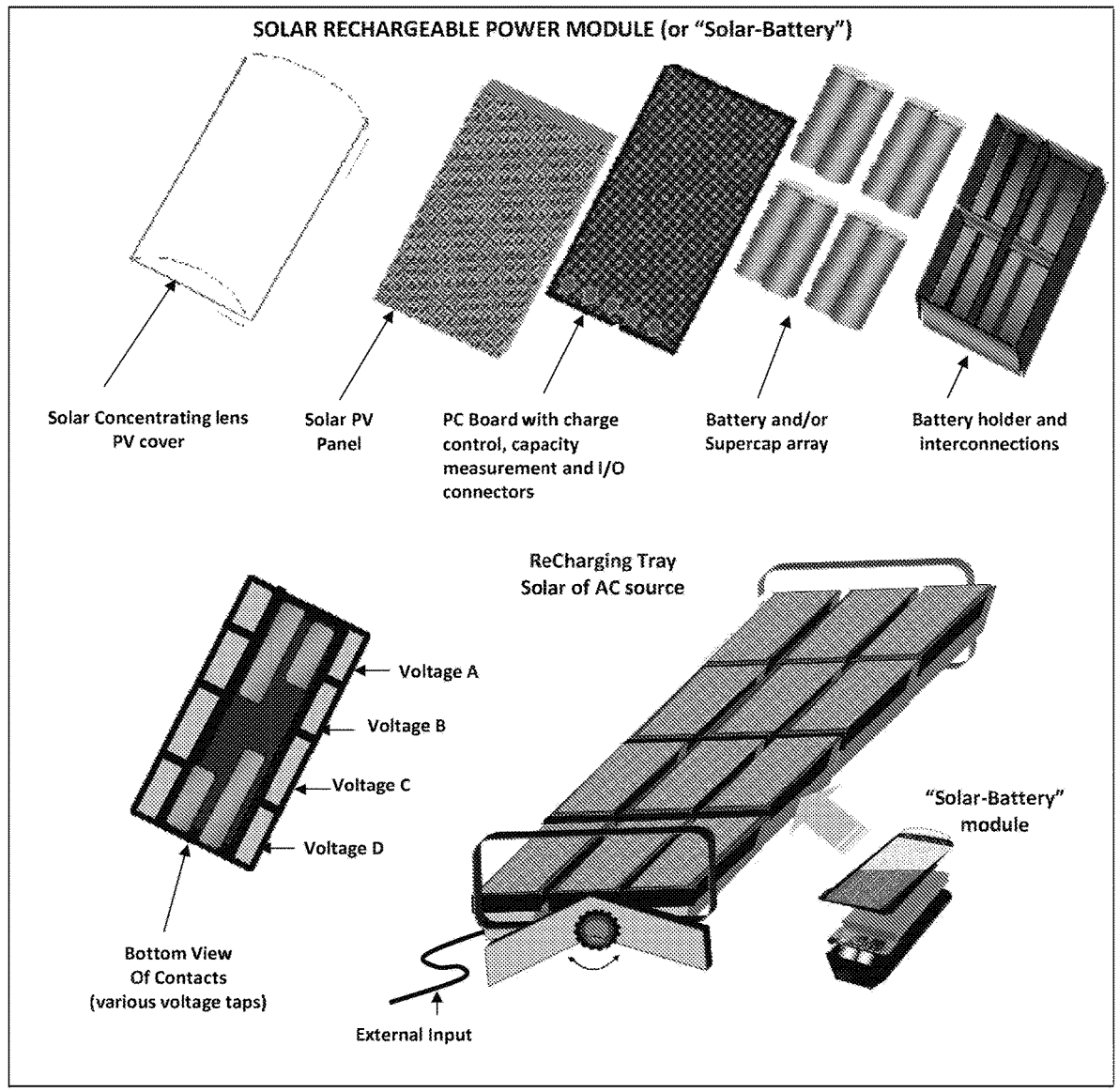
FIG. 5 contains drawings of an embodiment of a solar rechargeable SA-ID power module and multi-unit charging tray.

In at least one embodiment, an SA-ID Power module uses a source of renewable energy, for example, solar or wind, as shown in FIGS. 5 and 13, to generate power independent of an externally-generated source (for example, electricity from a local power grid or external generator). Renewable power generating devices used in an SA-ID Power module include but are not limited to, e.g., a photovoltaic (PV) panel, fuel cell and/or small wind turbine. A power generating device in an SA-ID Power module may be coupled with one or more devices that store energy, such as, e.g., a battery, supercapacitor, liquid storage medium and/or other energy storage method. Conversion to electricity and power delivery may be regulated by an electronic charge controller that may include a power sensor to measure the power stored and available for use at any given moment.

At least one embodiment an SA-ID Power Module is supplied by an external power source, for example, electrical mains or emergency generator, with a suitable voltage converter if it is required to operate SA-ID Modules and Devices. In at least one embodiment where an SA-ID station operates online-voltage electricity, an SA-ID Power module may be as simple as a pass-through wiring module with circuit protection and connection terminals.

An SA-ID station will at a minimum provide a Location ID capability that is more effective than prior solutions, particularly at night. An SA-ID Power module may be renewably supplied, or it may be connected to a local source of externally-provided power that is used to supply power to reenergize a power storage device in an SA-ID Power module.

At least one embodiment uses external power to charge a power storage device in a Power Module, for example, a battery. If external power fails, an electrical sensor will signal a transfer switch to change the power source for the Power module from the external power source to the output of an energy storage device in the SA-ID Power module in order to continue to operate selected accessories and devices supplied by the Power module.

At least one embodiment an SA-ID Power module is connected directly to an external power source that will power the SA-ID system, with an SA-ID power storage device ready as a backup. If the external power source fails, a charge sensor will detect that failure and cause the Power Module to deliver power to the apparatus from the power storage device. The power storage device may be replenished by the external power source if external power resumes operating, or by a renewable power source if external power does not become available.

If a power storage sensor detects that the amount of energy stored in the internal power storage device supplying the SA-ID Power Module falls below a predetermined level, an external power source may be activated to recharge a power storage device supplying the Power module. An external power source may also be used to supplement the power available from a renewable Power source in the event that a charging sensor indicates that the amount of renewable power being provided is insufficient to fully recharge a storage device supplying an SA-ID Power module.

In at least one embodiment of the invention, at least one SA-ID Power storage device is designed to be installed or removed from an SA-ID apparatus in order to be relocated to a place where it is recharged and then reinstalled in the SA-ID apparatus. A Charging Tray designed to hold SA-ID Power storage devices Modules enables one or more Power Modules to be recharged simultaneously as shown in FIG. 5.

In at least one embodiment of an SA-ID Power module, one or more power generating devices, storage devices and related electronic such as charge control, charge level sensor and output connections are arrayed together in a waterproof enclosure.

Power from an SA-ID Power module in an SA-ID assembly that includes an SA-ID Light module may also supply at least one Accessories module and/or accessory device.

In at least one embodiment, at least one SA-ID device may be enclosed in a Faraday cage in order to eliminate stray RF signals and noise.

(2) SA-ID Light Module

At least one embodiment of an SA-ID Light module contains at least one SA-ID light source (an "SLS") producing light of at least one color, which light may or may not be in a frequency spectrum visible to the human eye. The light from an SA-ID Light module will be used for at least one purpose such as for example, (a) to directly or indirectly illuminate a visible SA-ID Location ID display, (b) to cause a phosphorescent material in an SA-ID Location ID display to become excited and emit UV light to make an SA-ID Location ID more visible, (c) to provide Infrared (IR) light that will supply night-vision illumination for an accessory device such as a camera, (d) to emit a programmed series of at least one color-coded light signal controlled by a programmable activator to indicate at least one condition at a location (see FIG. 3).

In at least one embodiment of an SA-ID station, a Light module will contain an array of at least two SLS light sources, at least one of which includes an SLS equipped with a focusing lens to create a narrow beam of high-intensity light that can be seen from a distance and/or above the tree line, as shown in FIG. 17.

At least one SA-ID embodiment, an SA-ID Light module will be activated by one or more sensors, such as, e.g., a daylight photocell, proximity sensor and/or charge level sensor. A sensor in a Light module will control the power delivered to one or more selected SLS devices in a Light module so that the light emitted will respond to conditions detected by a sensor and/or a signal received from an external source, for example a remote alert control and/or over a network.

In at least one embodiment, in addition to a Light source, an SA-ID Power Module will supply power to at least one transceiver device. In at least one embodiment, a transceiver device is mounted inside of an SA-ID Light Module. A transceiver may be coupled over a communications network to at least one interoperating remote alert device inside and/or outside the location, as shown in FIG. 15. A Transceiver may also communicate with other transceivers accessible over a network. A multiplicity of available transceiver types will operate in an SA-ID system using a variety of frequencies and transmission protocols over compatible networks as described herein.

A Light Module will contain one or more SA-ID Light Sources (each an "SLS") selected from among a multiplicity of available products and configured as described herein to supply front lighting, backlighting, edge lighting, color coding and time varying illumination of a location ID and/or to indicate a location alert. While there are a number of lights for illuminating address numbers, including some that are solar-powered, they all provide only a single color of light of limited brightness with a short operating time, rarely over four hours. The SA-ID light module with transceiver is superior to prior solutions in that it does not simply light a house number; rather, it is fully interactive with a series of remote controls and sensors, may emit coded signals to indicate an alert of emergency condition, may interoperate with other devices to form a neighborhood network, and may communicate the exact location and nature of an emergency and the condition of its occupants.

(3) SA-ID Transceiver Device

An SA-ID Transceiver device is an active element in an SA-ID system that enables at least one other SA-ID element linked to a first transceiver to communicate and interoperate with at least one other active SA-ID element linked to a second SA-ID transceiver over a network. An SA-ID transceiver enables an SA-ID station in a location to send and receive information to and from devices interconnected in a single location or across an extended multi-location SA-ID network. An SA-ID system containing one or more appropriate compatible transceiver devices may operate over a wide geographic area using an integrated wired and/or wireless network.

An SA-ID Transceiver may receive and/or transmit information from and/or to another SA-ID device, including at least one SA-ID transceiver (which may be integrated into an SA-ID device or module). An SA-ID transceiver will operate using at least one available wired or wireless communications medium and communications mode. In the present application, a transceiver is understood to include devices that operate as a transponder. A transponder will receive a message and then retransmit it in a modified form, such as for example, by adding its own location ID and timestamp.

At least one embodiment of an SA-ID system on the SA-ID platform is achieved through the inclusion of at least one of a multiplicity of compatible interoperating SA-ID transceiver devices to expand the functionality of a system by linking it to at least one other remote SA-ID active accessory device and/or system through a compatible transceiver in the second system.

An SA-ID apparatus may be expanded through the installation of at least one of a multiplicity of interoperating SA-ID modules or compatible interoperating accessory devices such as an SA-ID transceiver. The addition of a transceiver will enable at least one single location SA-ID station to communicate with compatible local and remote transceivers and accessory devices (see FIGS. 14, 15, 16, 17 and 18).

In at least one embodiment of an SA-ID system, a distributed block chain database will record details of a message, including but not limited to (a) ID of sender, (b) time of message, (c) location of sender, (d) source of a message, (e) content of message or checksum of message content, (f) priority of sender and/or message, (g) number and location of retransmission forwarding "hops". The block chain will maintain a complete record of messages and alerts, so that it becomes virtually impossible to falsify or change the content or parameters of a message. This will discourage false alerts and other malicious use of an SA-ID network and allow an archive of messages to be validated and verified.

An SA-ID system serving a single location may contain one or more SA-ID station embodiments, each coded to indicate a different area of a location where it is installed. An SA-ID system in a single location may also contain different application-specific SA-ID implementations. One SA-ID station serving a single location may be configured to not intercommunicate with at least one other SA-ID station at the location site, but may communicate with at least one other SA-ID station at the location site, and/or with at least one other SA-ID device located remotely.

At least one embodiment of an SA-ID station contains at least one of each of an SA-ID power supply (with/without remote power input), a Light module controlled by a daylight sensor, an SA-ID Location information display, and an SA-ID wireless transceiver. An SA-ID transceiver will receive and send signals from at least one remote communicating device, for example, an emergency alert pendant, bracelet, pushbutton switch, walkie-talkie, communicating smoke, fire, intrusion or air quality alarm, an interior "Smart House" communicating "Home Hub" such as Google Home, Amazon Alexa Dot and Echo, Apple Home Pod, Samsung SmartThings and/or numerous others. An SA-ID app may also be installed on a tablet, PC, or smart phone. Each such remote device may contain one or more user-activated buttons, commands and/or sensor devices that report conditions at the subject location automatically and/or by user activation.

In at least one embodiment, an SA-ID transceiver is connected to a controller/activator that will interoperate with at least one other SA-ID device and/or SA-ID module, such as an SA-ID Light module, as well as with at least one SA-ID interoperating remote control alert device.

For example, when a remote-control alert message is sent to a transceiver in an SA-ID station, it may trigger a sequence of one or more of a variety of preprogrammed responses that indicate conditions at a location. If a user has conventional security, intrusion, fire, or alarm devices, and/or home automation devices and controls, these may also be linked into an SA-ID network. Thus, an SA-ID station will communicate an emergency alert and request for help to the outside world, in addition to providing an improved Location ID.

In at least one embodiment, an SA-ID Station will contain a water-tight or highly water-resistant compartment, with a water ingress protection rating (IP rating) of IP69 or better, to house an SA-ID Power supply, control board and relater devices, including an SA-ID transceiver. An internal or external water-level detector such as a float device may activate at least one alert message as described herein.

At least one embodiment of an SA-ID station includes at least one interoperating SA-ID accessory device. An SA-ID accessory device may be installed in an SA-ID Accessories module or SA-ID station enclosure, and/or it may be located remote to an SA-ID Station and communicate over a network. SA-ID accessory devices include, but are limited to, for example, one or more of a smoke detector, video camera, speaker, microphone, water level gauge, home or building automation hub, siren, small high-intensity light beams in white and/or colors equipped with color and intensity controls. An SA-ID system with a connection to a network such as the Internet, cellular, landline and satellite networks may be equipped with autodialing and configured to send a preprogrammed message. Multi-band communication capabilities are achieved using an SA-ID accessory device containing a circuit board with components such as the Snapdragon chip series from Qualcomm or an equivalent.

a transceiver device is a device comprising both a transmitter and a receiver that are combined and share common circuitry or a single housing. When no circuitry is common between transmit and receive functions, the device is sometimes called a transmitter-receiver. In the present application, the, t term transceiver is used to include collectively a transceiver, transmitter-responder, transponder, transverter and a repeater, and also includes including any antenna appropriate to each. A transceiver in the present application enables an SA-ID device to communicate with at least one other SA-ID device over a network. No other location address identification system or mailbox, besides the present application, contains a transceiver of any sort and is therefore unable to provide any non-visual address information, external communication about conditions at a location, neighborhood alerts, alarms, or warnings. The SA-ID device is a superior solution to prior approaches for address identification because it is able to wirelessly send a location ID that will guide First Responders and others to the exact location of the SA-ID device. The SA-ID device may also send advance information about the condition of the location and occupants.

(4) SA-ID Accessories Module

An SA-ID Accessories module is an enclosure that houses one or more SA-ID compatible accessory devices. An SA-ID Accessories module contains at least one mounting plane and power bus where one or more SA-ID devices may be installed and powered, as well as data connections to link interoperating devices. An SA-ID Accessories module provides power to SA-ID accessory devices via a connection to a power bus supplied from an SA-ID Power module. An SA-ID Accessories module also provides interconnection to other SA-ID devices and modules. Once installed, an SA-ID Accessories module facilitates future system expansion through the installation of additional SA-ID accessory devices and connection to the internal power bus and interconnection terminals.

An SA-ID Accessories module may be populated with compatible SA-ID devices activated and controlled from software in a resident CPU/microcontroller. In at least one SA-ID embodiment, one or more light sources are controlled by a programmable actuator coupled to at least one transceiver located in an Accessories module. An actuator responds to signals from a transceiver, causing at least one light source to operate in at least one preprogrammed mode in which the light source will, for example, emit different colors, sequences and/or intensities of light in a code that indicates the nature of local conditions.

A multiplicity of interoperable SA-ID accessory devices and SA-ID software (including but not limited to those listed as examples in FIG. 32A-C) can be added to an SA-ID system to expand its capabilities. These may be collocated in an SA-ID module enclosure or located remotely in a distributed SA-ID network. SA-ID accessory devices and software provide additional services and functions delivered by an SA-ID system. SA-ID accessory devices include but are not limited to, e.g., a video camera, audio transducer, GPS device, a machine-readable code reader such as a barcode scanner, a fingerprint scanner, voice and facial recognition devices and software and other single- or multi-factor verification systems used to confirm and record authorized and/or unauthorized attempts to access a location.

An SA-ID embodiment may be interrogated and/or operated remotely through a secure network interface using a variety of user input devices connected to an SA-ID network, such as a landline telephone, mobile phone, laptop, computer, tablet or other compatible network-connected device. A connected device may be equipped with SA-ID software that enables it to access and control one or more active elements of an SA-ID system.

In at least one SA-ID embodiment, permitted access may be restricted to a specific individual, time frame, area or other parameter determined by SA-ID software and established by a user or administrator. Such access permission control may be, for example, based on authentication of an individual by at least one authentication factor, such as for example, a fingerprint, access code, card scan, facial recognition, or other available authentication technology. Permission for an individual to enter a location based on authentication may be limited to a specific period of time and/or area of a location. Multi-factor authentication techniques, well-known to those skilled in the art, may also be implemented.

At least one embodiment of an SA-ID system will include a transceiver linked directly or through a network to a CPU/microcontroller and memory capability that will receive, store, analyze (using software such as, e.g., facial recognition), and retransmit a time-coded analysis and record of information received from local and remote sensors and other devices at a location. For example, this information may include information such as alerts, signals from other transceivers, information generated by local and remote sensors and other devices in an SA-ID network. This time-coded information will be archived locally and/or on a server operated by a remote service provider and stored in a database that may use conventional database technology and/or block chain technology to maintain secure long-term storage to enable services that include records of, for example, videos of all visitors, progressive health information gathered from biosensors, environmental conditions, power outages and/or anomalies, mail deliveries and other events of interest to a user.

An SA-ID Accessories module is a dedicated plug-in enclosure that will house and provide power and data connections for one or more SA-ID active accessory devices able to interoperate with at least one other SA-ID active device, for example, a transceiver with wired and/or wireless network connection, a CPU/microcontroller, a software module, a sensor, an activator, and/or another compatible sensor/actuator including but not limited to those described in FIG. 32A-C and illustrated in FIG. 25. While there are small video cameras and webcams, speakers and microphones, small video monitors, occupancy, proximity, motion, smoke and other sensors as described herein, presently available products and systems provide no solution that enables a group of these to be configured to operate together, mounted to a backplane that provides power, data connection and proper functional location for the purpose of supplying information for and about a location. SA-ID Accessories modules may be "stacked" so that a large number of accessory devices may easily and quickly be installed in an SA-ID embodiment (such as accessory devices included for example, FIGS. 1 and 32A-C) for additional system expansion, using devices described in FIGS. 1 and 32A-C, and in the associated drawings.

5. SA-ID Location Identification Module

An SA-ID location identification display may consist of one or more of a visual display, electronic, audible or inaudible signal, coded signal, combination thereof and/or any other means that communicates at least one unique ID associated with a location as described herein. Communication of a location ID may be intended for a person and/or for an SA-ID compatible device.

At least one embodiment of an SA-ID Location ID module will provide a visual display with an alpha-numeric address indicator. An SA-ID location ID may include a display or portion of a display that uses a reflective, luminous and/or luminescent material.

At least one embodiment of an SA-ID Location ID display contains a multi-layer visual display that incorporates a visual alpha-numeric address. FIG. 22 depicts an embodiment of a multi-layer visual display that includes an alpha-numeric address, and at least one of: (a) a reflective panel, (b) a luminous panel impregnated and/or coated with a luminescent material such as a paint or small particles, and/or (c) a panel that is etched and lighted from behind and/or through at least one of its edges, and/or (d) a translucent backing panel. These layers serve to enhance the visibility of the alpha-numeric characters.

In at least one embodiment, an SA-ID location display will include material that becomes luminescent when excited by a UV component of daylight or UV emitted by an SLS light source. Such material may be deposited on or embedded in a film that will fluoresce when it is illuminated from the front, rear or edge. An example of one such material is "Day-Glo" powder that is produced by Day-Glo Color Corp.

In at least one embodiment of an SA-ID Location ID module, at least one section of the display includes a graphic that has been produced by a computer printer printing on a transparent/translucent sheet. A computer-generated graphic may include the Location ID information of virtually any length, overcoming a limitation in the number of alpha-numeric characters that may be accommodated by existing solutions. Templates may also be provided that include special symbols to indicate that an occupant of a location is blind, disabled, handicapped or otherwise in need of special consideration.

In at least one embodiment of an SA-ID Location identification panel, at least one section of an SA-ID Location ID display panel includes an image or message produced by a programmable array of SLSs driven by a microprocessor/microcontroller. An SA-ID Display may also include an image on an electronic display embedded in the SA-ID ID display module that is produced by a camera, recorder or computer.

In at least one embodiment of an SA-ID Location ID display, an audio speaker and microphone (together an audio transducer) is included to provide any of: music, an audio track to accompany a visual display, an alarm or warning message, and/or real-time communication between an individual near the SA-ID station and a person in the location.

Figure 6:
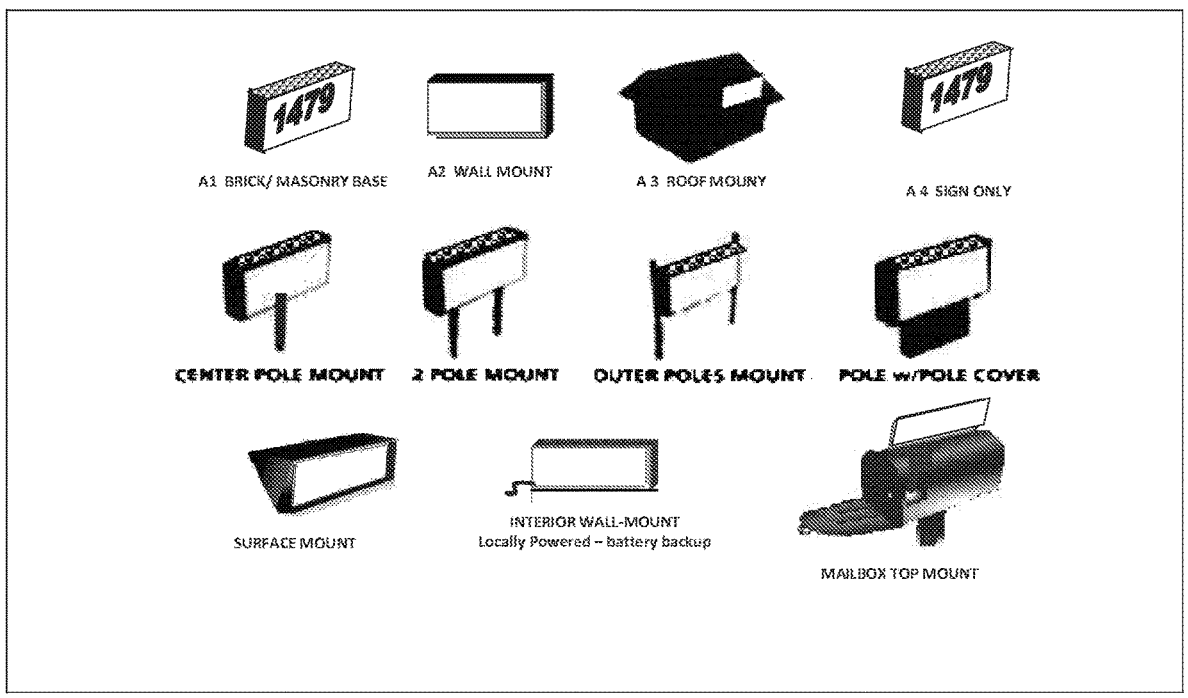
FIG. 6 depicts selected embodiments and implementations of fixed-location pedestal-mounted SA-ID stations and inter-operating devices that may be configured to create SA-ID systems.

Embodiments of SA-ID configuration with an SA-ID Address Identification module are shown in FIGS. 6 and 12. An SA-ID Address ID will provide a more readily-identifiable Location ID than previous solutions. An SA-ID embodiment that is solely for the purpose of location identification may not include a communications transceiver or user remote control device, as shown in FIGS. 12, 13 and 14.

A person skilled in the art may envision many combinations of materials of at least one embodiment of a luminescent panel in an SA-ID Location ID display module contains and elements that may be used in an address display which have varying properties of light emission, reflectivity, transmissivity, fluorescence and image presentation.

The elements of SA-ID display embodiments described above may be combined, removed, or the layers reordered or rearranged, to create different embodiments of the present application. A combination of such elements or embodiments to create a particular embodiment of the invention would be within the scope and possession of the invention and knowledge of the inventor or those skilled in the art, and is considered to be covered under the scope of the present disclosure. For example, some, but not all, of the elements that may be combined to create an embodiment of the invention are shown in FIG. 1.

Figure 11:
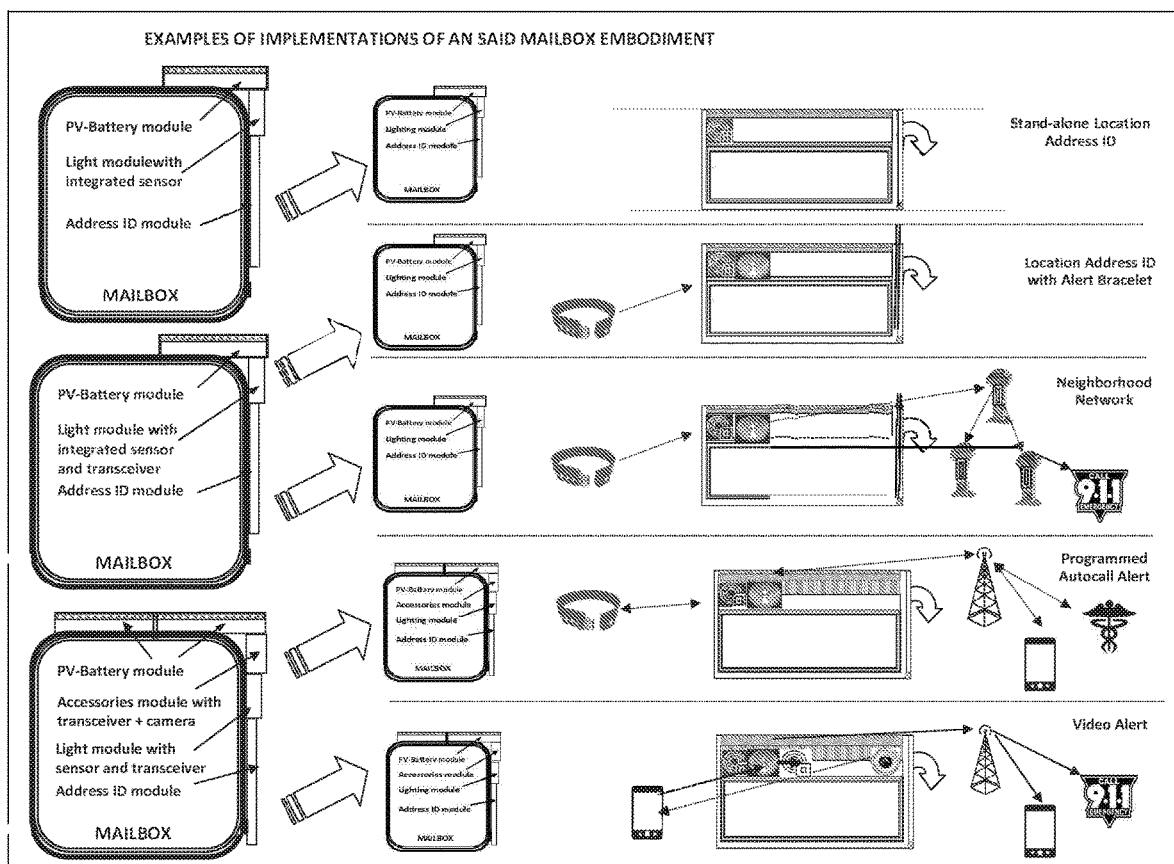

The SA-ID Location Identification solution is superior to previous Address Identification solutions because the SA-ID Location Identification solution may include:

(1) Alphanumeric Visual Display
 a. in the most simple application, a combined SA-ID power module and light module with daylight sensor may be used to illuminate a conventional alpha-numeric house number attached to a mailbox and/or outside of a location;
 b. an SA-ID system in a. above may be enhanced by additional SA-ID devices as illustrated in FIG. 11;
 c. the use of a computer-printed transparency with templates as an Address ID Display permits a much larger number of alphanumeric characters with no shortage or waste. In order to generate the computer-generated portion of such a display, a user will be provided with a CD containing an SA-ID graphics and template application, or supplied with a link to a website, where a user may enter a location and other data to be included in the display, and the application will reference applicable codes for the location and assemble a template with the location ID into a customized printable format. A user may choose among different styles of code-acceptable letters and numbers and may import a personal graphic image or message to include in the Location ID display, including, for example, e.g., a photo, Holiday Greeting, Family Announcement, Medical or Handicapped symbol or other visual elements. A Location ID display transparency may be easily removed and a new transparency inserted whenever the user desires. Electronic displays of different sizes may be inserted in specific area of the Location ID format for time variant messages programmed from a computer, smart phone, memory chip or other user-input device.

(2) Non-Visual Location ID

Audio announcement—an SA-ID Location ID may provide non-visual information by means such as, for example, e.g., an audible announcement, or a series of codes that may be audible and/or inaudible to humans, such as described herein. This capability represents a significant improvement over existing methods of location identification, since it may provide this information in the event that the Location ID is not able to be seen for any reason, particularly in an emergency. Examples of such situations are described in this specification.

An SA-ID Location ID module may range from a simple visual alpha-numeric address display to a multi-layer visual display as illustrated in FIG. 22. The SA-ID Location ID module may also include non-visual identification methods such as a coded sequence of audio or RF pulses and other methods described herein. The SA-ID Location ID module will function in normal daily use or in virtually any emergency situation or natural disaster. The SA-ID Location ID module can provide visual information, as well as non-visual identification information by audible and inaudible message as further described herein.

6. SA-ID Secure Storage Module (Mailbox)

Secure Mailbox—At least one embodiment of the present application is designed to be integrated into a mailbox, installed as a retrofit to an existing mailbox, or added to a post used to support a mailbox, as shown in FIGS. 14 and 17.

At least one embodiment of the present application is integrated into, or attached onto, an enclosure that serves as a repository for the delivery of mail, documents and/or packages, as described in the specifications and drawings herewith.

At least one embodiment includes a mailbox and/or package delivery compartment attached to an SA-ID enclosure, as shown in FIG. 14, where an SA-ID power module supplies power to operate active devices that enable at least one of the following functions (1) mailbox intrusion detection and protection with an electronic/electromechanical lock, (2) an intrusion alarm, (3) delivery and/or pickup access approval and notification, (4) identification of an authorized delivery agent. Individual authentication is accomplished using methods including for example, card scan, short-range RF (e.g., RFID, IRDA, NFC), fingerprint or camera facial recognition, or keypads with single and/or multi-level passwords, and other technology for such single or multi-factor identification and authentication as are known to those skilled in the art and may already incorporated into other consumer devices such as mobile phones, laptops and door locks. A time-stamped record of approved and/or attempted entries will be retained. Permission based on proper authentication in order for an individual to deposit or remove mail, enter a location or perform other tasks may be limited to a specific period of time and/or area of a location.

Figure 10:
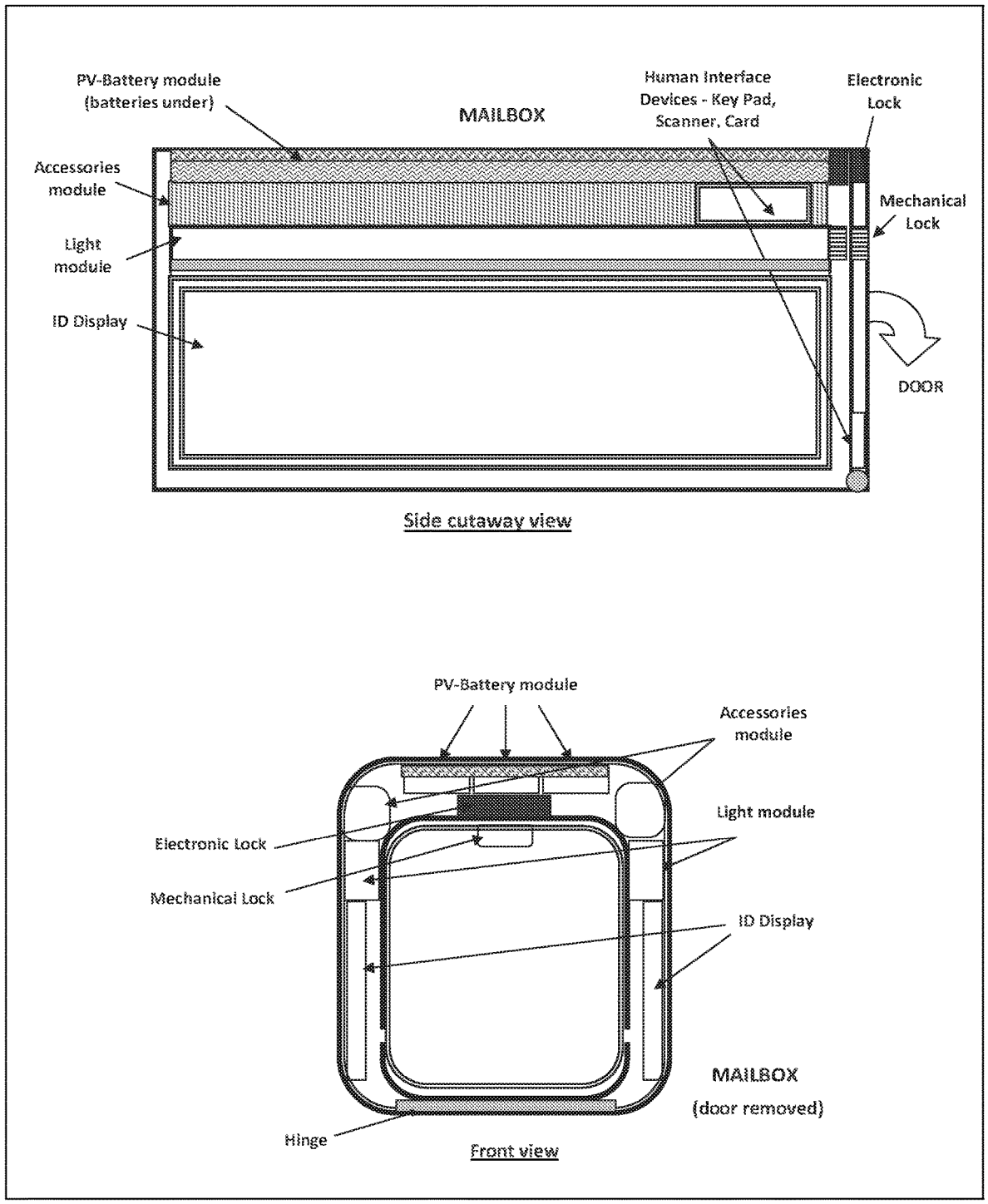
FIG. 10 depicts an embodiment of an SA-ID station that is fully integrated into a secure mailbox.

At least one embodiment includes the complete integration of modules and devices described above, e.g., power supply, Light module, Location ID display, accessories, sensors and recording devices as described above into a stand-alone mailbox and/or package delivery container (see FIGS. 10, 11,14).

In particular, an SA-ID embodiment that operates as a fully self-contained secure mailbox as shown in FIGS. 10 and 11 provides major advantages over existing mailbox solutions in a number of important ways, for example,
(a) it can be remotely locked and unlocked over a network;
(b) it can provide a superior lighted SA-ID location ID built into the device;
(c) it can be equipped with a scanner to provide limited access to authorized service agents as well as notice to the owner of deliveries and/or pickups;
(d) it can record authorized deliveries and attempts at unauthorized access
(e) it can be used as an alert device with color coded light codes to indicate an emergency condition;
(f) it can transmit information from sensors and access control devices over a network for remote response and/or archiving using an integrated transceiver.
(g) A secure storage module for mail, documents and packages (for example, a mailbox), forms another class of embodiments of the invention. Embodiments include (a) retrofits for existing mailboxes as depicted in FIGS. 6-9, and (b) one or more embodiments of a fully self-contained SA-ID secure mailbox. At least one embodiment of an SA-ID secure mailbox includes a networked electronic lock and/or accessories such as a camera, fingerprint reader, proximity sensor, audio transducer and/or other accessories as further described herein and depicted in the drawings. Software and/or firmware will enable single-factor and/or multi-factor identification access control and/or intrusion detection and alarms using devices selected from among those included in FIG. 33. Embodiments of a self-contained Secure Mailbox can contain one or more active SA-ID devices housed in a single enclosure, as described herein and illustrated in FIGS. 10, 11 and 14

7. SA-ID Software

SA-ID software elements can be located in any and/or all of a fixed SA-ID device, a mobile SA-ID device, in a computer accessed over a local network and/or remotely in the cloud. SA-ID software elements may operate independently in a single device, or they may interoperate as a distributed application across multiple devices as well as elements in networked computers and/or the cloud. SA-ID software elements may include one or more of (a) a software application, (b) a software element, (c) a component of a distributed application, and/or (d) a software module. SA-ID software may be a fully self-contained program that will operate a single device or module independently of other devices. The term "software" is used in a general sense and is understood to also include firmware that may be embedded in a device. SA-ID software may be distributed across two or more interoperating devices or modules that are linked directly or over a network, where the output of the software in a first device or module causes software in a second device or module to respond in a preprogrammed sequence. Software may be deterministic or adaptive to changing conditions and inputs (using machine learning and/or "artificial intelligence"). SA-ID software may be distributed in such a manner that a first software element resides in one location, for example, an SA-ID station, and interacts with one or more other software elements that reside in one or more external locations, such as for example, a local or remote computer and/or a computer on the cloud. In this latter case, each software element is able to interact with at least one other software element over an integrated network to deliver desired overall SA-ID system functionality.

Software may be general to an embodiment and/or it may be application-specific. Application-specific software enables at one embodiment of an SA-ID system to be used for different application-specific implementations.

SA-ID software may be a general-purpose program that manages the basic functions of an SA-ID embodiment under a set of baseline conditions, or it may be an application-specific program that is tailored to respond in a particular way to specific inputs indicating particular conditions. In this way, SA-ID software may be installed in a "general" SA-ID embodiment, for example a columnar embodiment, as shown in FIGS. 20(*a*) and 20(*b*). In the embodiment shown in FIG. 20(*a*), the SA-ID functions as a pathway illumination bollard. This application-specific implementation is managed by a software application that resides in a sensor-driven switch. When it gets dark, the switch receives a signal from a daylight sensor that will cause the light module to turn on and operate at a low level during the evening, When a person approaches, a proximity sensor will send a signal to the software-controlled switch that will cause the light module to increase to a higher level to improve visibility. After a person passes, the proximity sensor will then send a signal that causes the light module to return to a previous level.

SA-ID software includes firmware for devices and/or modules, as well as distributed software modules and applications residing in one or more SA-ID systems and/or in the cloud. Software may be general to an embodiment or tailored to an application-specific implementation. SA-ID software will determine system operation in response to conditions, applications, and inputs. An SA-ID software application is configured for an application specific embodiment and operates on a database that may be installed locally on an SA-ID system and/or remotely on the cloud. The local database may also be backed up on the cloud. Complex operations such as building and maintaining a large database of multi-factor authentication parameters and analyses of members of a community may be performed on a sophisticated computer in the network, or in may be located on the cloud. A limited amount of information that is required at a particular location may then be downloaded locally to that site, in a server-client relationship, in order to utilize local computing more efficiently and/or storage resources 8. SA-ID Accessory Devices The SA-ID platform architecture enables one or more of a multiplicity of compatible active devices, modules and accessories, both local to and/or remote from an SA-ID station, to interoperate within an SA-ID System. Compatible devices include, but are not limited to for example, one or more of a transceiver, CPU/microcontroller, sensor, actuator, A-to-D converter, user-activated remote control alert device, and/or other devices, including but not limited to those such as those included for example, in FIGS. 1 and 33, that, individually or in combination, are able to interoperate, or to enable interoperation of an accessory device, in an SA-ID system.

Figure 4:
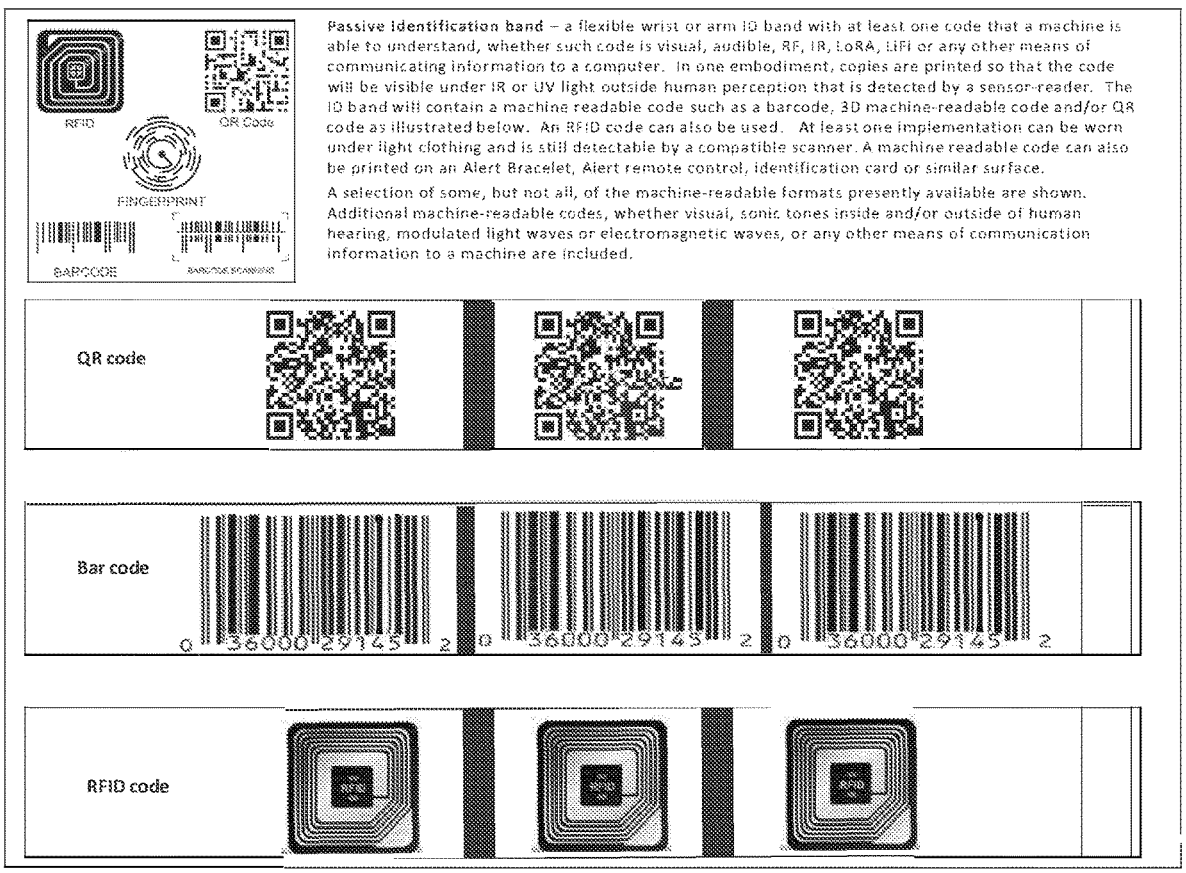

At least one embodiment of a user-activated SA-ID remote control alert device includes internal solid-state memory with a USB or similar port as shown in FIGS. 3 and 4. The Internal memory may be used to store vital user data such as medical records, contact information for doctors, relatives, or other persons, agencies or institutions. Sensitive data may be encrypted for cybersecurity.

Embodiments of the SA-ID platform broadly described in this summary section may be housed in one or more of a series of SA-ID enclosures designed for an Application-specific implementation. Some, but not all, SA-ID enclosures and mounting configurations are included as representative elements of an SA-ID embodiment in the specifications and attached drawings such as FIGS. 11, 12, 13, 14, 15, 16 and 17).

While there are legacy access monitoring devices on the market such as "video doorbells" and remote security cameras, these are generally dedicated devices in stand-alone systems that cannot be integrated into a broader interoperable platform that contains numerous other types of devices, such as can be constructed using the SA-ID architecture. The usefulness of such legacy devices is substantially expanded when they are incorporated into an SA-ID network as described in the present application, providing expanded capabilities for uninterruptable emergency response use, access monitoring and control, and neighborhood alert, among others capabilities that are not provided by any existing product or system.

An SA-ID active device (or simply an "SA-ID device") will interoperate with at least one other SA-ID device, including but not limited to a transceiver, a remote and/or local sensor, a user alert remote control, an actuator (for example to trigger an output device such as a light, siren or auto dialer), a mobile phone, a proximity sensor or other device that will provide information about a condition at a location. A description of some, but not all, such devices are included as examples in FIGS. 1 and 33 and also depicted in the drawings. In at least one embodiment of an SA-ID portable user remote control, the device will transmit the button pressed (to identify the type of alert), the time pressed, Location ID, User ID and any information appended to the User ID about medical or other conditions. An SA-ID Active device is also referred to herein as an SA-ID accessory device.

While there are devices available today such as sensors, cameras, speakers, and other devices, none of these devices have been integrated into a location address ID or mailbox in order to provide capabilities comparable to those enabled by the present application as described herein. Products such as video doorbells and intercoms provide limited visual and audio communication with visitors, but do not have the computer implemented functions such as facial recognition, voice recognition, badge scanners or other security features that are provided by an SA-ID system. Furthermore, no available product is powered by renewable energy with storage sufficient to operate for an extended period during an emergency, and is of no utility during a power outage.

9. SA-ID Network

SA-ID Networks and SA-ID Integrated Networks

An SA-ID Network establishes a link between a first SA-ID transceiver and a second SA-ID transceiver in order to enable communications between a first SA-ID device in a SA-ID system connected to a first SA-ID transceiver and a second SA-ID device connected to a second SA-ID transceiver in an SA-ID system. The SA-ID Network may link devices in a local SA-ID system and/or remote SA-ID system.

When a set of one or more separate networks are linked to one or more elements of an SA-ID system to enable SA-ID elements to intercommunicate and interoperate across separate networks, the set of intercommunicating networks is referred to as an Integrated Network.

At least one embodiment of an SA-ID system interconnects separate SA-ID networks to form a single integrated network that links a multiplicity of SA-ID Systems and forms an expanded multi-location wide-area SA-ID network. The SA-ID network is implemented by linking at least one transceiver in an SA-ID system to an integrated network that operates using both wired and wireless communications channels to communicate with at least one other SA-ID network via a second transceiver.

A further set of embodiments enhances the functionality of an SA-ID system by linking an SA-ID system to an integrated network connecting to one or more separate interoperating SA-ID systems. The linked SA-ID systems may be relatively close to one another, for example in a local neighborhood, or they may be widely dispersed over a group of distant locations, such as in a large city or a rural environment. An embodiment of a linked SA-ID system is enabled by configuring a transceiver in an SA-ID station to interoperate over an integrated network with at least one other separate SA-ID transceiver in another SA-ID system at a different location. This linkage is accomplished over an integrated network, which operates over wired and/or wireless communication channels as indicated for example in FIG. 1, 4, 13 and in FIG. 18.

Such an integrated network topology may include one or more of a point-to-point, point-to-multipoint, a peer to peer network with a star structure and/or a self-healing mesh network of varying types. An Integrated SA-ID network architecture is used to create multi-location inter-communicating SA-ID installations, such as a community or city-wide emergency response system. Networks transmission media, network architecture and protocols that may be included in an integrated network include, but are not limited to one or more of the following: a wireless network, for example, RF, PLC, AM radio, FM radio, HAM radio, single band, multi-band, point-to-point, point-to-multipoint, mesh network, star network, frequency agile, ultrasonic, powerline carrier, spread spectrum, short wave radio, walkie-talkie and CB radio band, cellular, satellite, radio and TV sideband, IR/IRDA, ultrasound, sound beams, particle streams, light modulation (e.g., LoRA, LiFi), microwave. Wired networks include for example, physical wire, direct physical interconnection (e.g., on a PC board), PLC, Ethernet, POE, fiber optics and other "hard connections" between devices such as a connection between devices on a PC board.

At least one SA-ID embodiment will operate as an uninterruptable communications gateway that is connected to an integrated communications network. This embodiment will be used to collect and communicate information about conditions at a location accessible over an integrated network, and thereby deliver enhanced functionality and critical information to outside entities such as a neighbor or a first responder. This functionality enables the creation of a highly effective "Neighborhood Network".

Disparate networks may be integrated using an appropriate gateway and router in each network to link it to one or more other networks to form an "integrated network" as shown in FIG. 18.

The technology of network transmission media, network architecture, protocols and other networking design parameters and solutions are well known to those skilled in the field, and as such are not the subject matter of the claims in this invention.

SA-ID Network is a wired (including fiber optics and PLC), wireless and/or a combination thereof (an "integrated network") that will enable a first SA-ID device to communicate and interoperate with a second SA-ID device. In MTL, commercial, industrial or military applications such as those across a residential complex or campus, business/manufacturing facility or base/staging area, an SA-ID system that includes renewable energy and storage along with a group of appropriate transceivers may be used to implement a local network that will function reliably under harsh conditions and emergencies, and that may be linked to long-distance networks by the inclusion of at least one transceiver able to connect for example to an external satellite, broadband, cellular or landline network. This allows for a low-cost, rapidly installed but extremely flexible and reliable communications system that minimizes the need for expensive, long-distance transceivers. SA-ID systems leverage existing networks in unique and novel ways. In particular, there is no means currently available to implement a "neighborhood network" with connectivity to such critical contacts such as 911 emergency services as well as programmable calls to selected numbers programmed into the system. A product such as the "Help I Can't Get up" pendant provides some health alert capability, but is useless if a user is fully incapacitated, whereas sensors in an SA-ID pendant or bracelet will detect and signal an emergency even if the wearer is unable to. During an emergency, a well-equipped SA-ID system with multiple transponders will use any available network in order to send a message over multiple media, including for example colored light codes, audio signals, wired and wireless networks with messages to specific services and/or individual. The use of mesh network technology enables a first SA-ID system with a single transponder in the mesh to send a message to a second SA-ID system with multiple transponders so that message content can be relayed over multiple networks by transponders in the second SA-ID system.

The term "module" is used in the subject application to refer to functionality delivered by a set of interoperating devices and does not necessarily indicate that they are housed in the same physical enclosure. Elements of an SA-ID system may be contained in one single enclosure or they may be located in separate locations and/or enclosures. The specifics of packaging do not alter their coverage under the claims of the present application so long as they provide equivalent functionality.

Similarly, an SA-ID embodiment may be housed in a custom SA-ID enclosure, although this is not an essential requirement for an embodiment. In some cases, for reasons of cost or convenience, one or more of the elements of an embodiment described herein may be collocated in a single modular package or enclosure. Modules need not be physically distinct, that is, one or more elements may be combined in a single functional device, enclosure, module or printed circuit board. SA-ID modules may be "stacked" in order to interconnect power and communications from one module to another in order to expand an SA-ID station.

An embodiment and/or application-specific implementation of an embodiment that includes a set of interoperating active devices and which provides functionality equivalent to that of the invention described herein, irrespective of the manner in which it is housed or the components selected, is assumed to be covered under the claims of the invention.

Application-Specific Implementation of an SA-ID Embodiment

Specific applications of the present application may require modifications to the size, shape of arrangement of elements of an embodiment, and/or changes to software module. These variations are referenced herein as "application-specific implementations" and are considered to be covered as embodiments under the scope of the present application.

An SA-ID Application-specific implementation is an SA-ID embodiment that is custom-configured to meet the requirements of a specific application. An SA-ID application-specific implementation is an SA-ID embodiment will contain at least one application-specific element of hardware and/or software that is customized to meet a unique application-specific need. The architecture of one application-specific implementation of an SA-ID embodiment may contain the same set of basic devices that comprise a second application-specific implementation, except that in each there will be a custom-configured element of hardware and/or software that will modify its actual operation to meet the needs of a different application.

For example, as shown in FIGS. 20(a) and 20(b), both drawings depict an SA-ID embodiment in a vertical column format. Each contains a transponder, proximity sensor, multi-color light module and similar additional SA-ID devices and software. However, the application-specific embodiment 20(a) is implemented for use as a bike lane divider, and has customized software configured so that when it detects an oncoming rider, the SA-ID implementation causes the light module to execute a warning pattern when the rider is near, such as changing the color of the light or causing it to flash. It may also send an alert signal to an SA-ID device in a nearby vehicle.

Application-specific embodiment 20(b) is also built in a vertical column format. It will also contain a transponder, proximity sensor, multi-color light module and similar additional SA-ID elements and software. In the system of FIG. 20(b) an SA-ID implementation is configured with customized software that will cause it to, for example, provide path lighting throughout a campus. It may be programmed to detect an approaching person, and to increase the light level as the person gets closer, in order to enhance visibility. After a person passes, the SA-ID sensor and software may cause the light module to return to a lower brightness level. It may also contain a transponder that will receive an alert message from an SA-ID alert bracelet, local pushbutton or other alert device, and cause the light to flash brightly and/or turn the color blue, called a "blue-light function." At the same time it may relay an alert to campus police. Both implementations contain largely equivalent SA-ID elements of an SA-ID embodiment, but each constitutes a different application-specific implementation to meet different needs through variations in software and device configuration.

Application-Specific Implementation of an SA-ID Embodiment for an Apartment and Other Multi-Tenant Locations (MTLs)

At least one SA-ID embodiment of an application-specific SA-ID implementation is for an apartment complex, office building, multi-use facility, campus or university, or other location with multiple occupants (each a multi-tenant location or "MTL"). An SA-ID implementation for an MTL may include an indoor as well as an outdoor SA-ID system and devices. An SA-ID MTL implementation will contain at minimum an SA-ID Location identification module that will display an address visually and/or by electronic, electromechanical, or audible means, and a transceiver. An interior SA-ID location identification display may not be lighted unless an alert signal is received by the transceiver, at which time it will execute a preset lighting pattern, depending on the type of alert. An SA-ID MTL implementation may be powered by a local electric connection and/or by a power storage device. It may also contain a light-sensor so that it operates only when an area is dark. An SA-ID MTL implementation may operate on a stand-alone basis at a single location, or it may communicate using a transceiver linked to one or more separate SA-ID stations and/or devices.

Application-Specific Implementation of an SA-ID Embodiment for Health and Wellness At least one embodiment of an SA-ID system will implement monitoring for elders, handicapped, and other persons needing health and wellness information to be transmitted to such persons and facilities as, for example, caregivers, medical personnel, hospitals and clinics and/or family members. This is accomplished through the integration of one or more of an interoperable communicating sensor ("ICS") device into an SA-ID network. Non-intrusive ICS devices include but are not limited to: a motion sensor in a selected living area and/or a bathroom, a door-opener sensor on a refrigerator and/or other home appliance is (to infer that a person is eating regularly), a smoke detector, a thermostat, an air quality monitor, or one of a variety of commercially available communicating personal physical health and wellness monitors that provide functions such as pulse monitoring, BP monitoring and other health-related functionality. Infant-monitoring may be accomplished through the integration in an SA-ID system of such communicating sensors as a camera, microphone, diaper wetness sensor, pulse monitor and other environmental sensors and biosensors, some but not all of which are described in FIGS. 1 and 33A, 33B and 33C.

Application-Specific Implementation of an SA-ID Embodiment for "Home Heartbeat"

At least one application-specific implementation of an SA-ID embodiment will generate a repeating signal, for example, visual, sound (audible or inaudible), RF, or other output that will indicate that the location is active and occupied. A home heartbeat may be controlled by sensors and software that monitor activity within a location, such as a breathing detector, occupancy sensor, motion sensor and/ or other indication of life and activity. A programmed series of one or more "home heartbeat" signals may be detectable on a local basis and/or communicated over at least one available network. A home heartbeat may be transmitted using such methods as, for example, e.g., GPR, underwater tones and/or strobing light, to provide an alert that a location is occupied. A home heartbeat may be initiated by an emergency sensor, such as for example, a water level detector, emergency alert broadcast over a public network. SA-ID software for the home heartbeat application will then look for a sensor signal input from a sensor such as a breath detector, motion sensor or other indication of life at the location, and if one is received, the SA-ID system will begin to output a home heartbeat signal.

Application-Specific Implementation of an SA-ID Embodiment for Building Security The present application further addresses shortcomings in many conventional building security systems. These systems are generally designed to be activated when an intruder attempts or achieves unauthorized access into a location such as a home, building or other structure. By the time an intruder is inside a location, it may already be too late for effective reaction.

An SA-ID location ID display will generally be located at or near the entrance to a property, particularly when it is combined with a secure mailbox device, so that it is visible from a primary access road. From this position, a sensor in an SA-ID system, such as a camera, proximity detector, scanner and other sensors as described in herein may monitor, recognize, record and respond to an unauthorized intruder before that intruder is able to enter the actual location of concern.

Thus, an SA-ID station equipped with interoperating sensor Accessories provides an early warning and intrusion deterrent by activating lights, cameras, speakers, and sirens, while alerting neighbors and authorities. An independently powered SA-ID will defeat a common strategy of de-energizing a conventional alarm system that is often used by intruders.

Application-Specific Implementation of an SA-ID Embodiment for Mobile and Transportation Use At least one embodiment is housed in a mobile enclosure that is installed in/on a vehicle or other mobile location. A mobile embodiment may include SA-ID accessories including but limited to a GPS unit, speaker, vehicle diagnostic code (e.g., OBD) reader, transceiver, Light module, vehicle ID number, alert signal. At least one mobile embodiment is powered by an independent power supply module (solar and/or wind) which may also be linked to a vehicle's charging system (see FIG. 21). An alert from a passenger with a remote alert control device in a vehicle equipped with a mobile SA-ID embodiment may trigger an alert signal indicator on a vehicle. At least one application-specific implementation for an SA-ID equipped vehicle will receive messages from a communicating SA-ID Road Signs (such as, e.g., when a vehicle exceeds a speed limit or fails to observe a stop sign etc.), While portable solar-powered lighted highway signs exist today, the messages are either programmed in a microcontroller at the sign itself, or the sign may display a variety of messages that are downloaded to it over a wireless network. In this case, the network communication is 1-directional only (receive-only transceiver), so that sign receives instructions over a network but does not communicate back—either to the network or to the driver's vehicle.

The SA-ID embodiment of a communicating road sign features two-way communication over a wireless network, so that the sign can send messages to a driver and/or occupant of a vehicle, or to a more remote transceiver on the network that could be located, e.g., at a law enforcement or driver safety center. While there are also solar powered signs with a sensor to measure a vehicle's speed and visually display that speed with an array of lights that can flash if the vehicle is over the speed limit, other than this visual display, these signs do not communicate any other message wirelessly to the vehicle or to a network. And while signs and cameras of various types are being introduced currently into many municipal systems, they do not wirelessly communicate an alert message to a device inside a vehicle (for example, to provide a warning message or alert of a nearby bike rider), nor do they can communicate to a police facility over a network to issue a notice of an infraction.

The SA-ID solar-powered communicating road sign is unique in that it provides the above functions. It can selectively receive and send wireless communications to, from and between vehicles, drivers and/or occupants (for example, with a SA-ID device or smart phone), bike riders, pedestrians, traffic authorities and other locations on a network. Messages can include weather alerts, alert that a vehicle is about to pass its exit (through a link with a mapping program in the vehicle), or advising the driver that he/she is close to or is in fact exceeding the speed limit. A vehicle ID may be recorded, along with the driver ID, and a record of the violation, for future action.

If used with an autonomous vehicle, a SA-ID communicating road sign may be used to inform a vehicle of local conditions, delays, or alerts. This information can be generated locally and/or provided over a network.

In at least one implementation of an application-specific implementation, an SA-ID system in a vehicle will receive a signal from an SA-ID bike lane divider (see FIGS. 20(b) and 21) and will alert an operator or navigation system of the vehicle that a bicycle is nearby. The SA-ID divider column may also alert the bicycle rider to the proximity of a moving vehicle, for example by flashing a colored light on the divider column or by sounding a warning.

In at least one implementation, two or more Power modules and/or two or more Accessories Modules are stacked with a common power bus and data bus interconnecting them as shown in FIG. 14.

Application-Specific Implementation of an SA-ID Embodiment for a Smart City

Mounting cameras, sensors, communications transceivers and other electronics on streetlights and light poles is increasingly viewed as a means of implementing "smart city" infrastructure. However these existing systems suffer from a number of severe limitations, including: (a) their operation typically relies on the same electricity supply and wiring network that delivers power to the streetlights, and they are thus rendered ineffective in the event of a major power failure, (b) the primary objective of these systems is the monitoring and management of energy usage by local electrical devices such as the streetlights themselves, data from electric meters, control of traffic lights, parking meters and other municipal infrastructure—the needs of the cities' systems, not the much more diverse needs of its citizenry, (c) they are largely aimed at selected and specialized activities of high-density populations found in cities, not those of the typically more diffuse population found in an average town, suburb or rural environment; (d) these "smart city" networks are not designed to actively interoperate with devices in the hands of the average inhabitant, (e) the existing systems are closed platforms in that do not generally designed to interoperate with the everyday communication devices used by average citizens (such as a mobile phone or Internet access device), (f) in a major crisis where power and communications fail, existing systems offer no capabilities to address the emergency needs of residents. Some "smart city" systems that produce solar power, such as those manufactured by Petra Solar, deliver small amounts of electricity into the electric grid but have no significant power storage capability, and in the event of a power outage, they disconnect for safety purposes and cease to function entirely. Furthermore, solar and wind-powered streetlights that are being introduced in some areas attempt to actually light a roadway, and so their stored energy is dissipated for that purpose over a short period of time. These latter systems require substantial battery storage and may deliver only limited lighting capability at extremely high cost.

None of these meets the primary needs of a smart city, which are, in general, to monitor and control essential infrastructure systems, to enable communications, cooperation and support among and between citizens, municipal and medical personnel, first responders and others. These functions are useful during normal operations of a city, and become critical during a widespread crisis, power outage or other emergency.

An SA-ID system for Smart Cities uses streetlights and light poles with a differing view of the operation of streetlights installed in "smart city networks". The SA-ID invention described in the present application addresses shortcomings observed in existing systems that prevent them from meeting emergency requirements of a "Smart City" network to serve its citizens.

A key differentiator is that the SA-ID system does not depend on the operation of the electric power system that operates the streetlights. In an emergency that includes a power outage, the failure of the electrical supply to the streetlights will disable a conventional smart city information system.

In at least one SA-ID Smart City implementation of an SA-ID system, an SA-ID embodiment is mounted on a streetlight or light pole as shown in FIG. 28. This SA-ID station will contain at least one renewable Power Module and Accessories module and at least one transceiver device. Further implementations include one or more compatible accessory devices such as, for example, a sensor to monitor electrical and/or environmental conditions, a camera, a CPU/microcontroller and memory, a microphone, speaker and/or siren, a Light module that may provide programmable color-coded alerts and/or infrared night-vision capability, and an SA-ID location ID module.

At least one embodiment of a streetlight or pole-mounted Smart City SA-ID implementation will contain at least one transceiver programmed to receive, transmit and/or relay messages over such channels as for example, the Internet, cellular, satellite and/or first responder allocated frequencies. At least one implementation may deliver limited area lighting at the light pole for short intervals of time; however the primary purpose of lighting produced by an SA-ID light module is to communicate conditions using color coded signals with low-power SLSs, and/or to indicate the location of the pole during a power outage. In at least one smart city embodiment, energy stored in an SA-ID power module is dedicated exclusively to powering wired and wireless communications (and not to operating the streetlight itself), permitting the use of smaller capacity, less bulky and much less expensive energy storage devices.

Definitions

SA-ID System

—A Smart Address ID (or "SA-ID") system is a comprehensive platform of interoperable devices, modules and elements that may be installed and configured to perform a variety of functions, including but not limited to: identify a location, send or receive a message, communicate with a location and/or a person inside or nearby. If a 911 address has been assigned to a location, an SA-ID System will communicate that 911 address.

SA-ID Member and Neighborhood

—An SA-ID system will have an associated group of one or more "members", that is, a device, a location and/or an individual that is uniquely identified and included as a recognized "Member" of an SA-ID system "population group". For example, a resident of a neighborhood and their associated individually-identified SA-ID devices and/or SA-ID remote alert control will be recognized as Members of an SA-ID system or neighborhood. One or more Members may be given a priority level. A Member may be removed from membership by a person with administrative privileges for an SA-ID system.

An SA-ID system may contain a list of one or more priority identifiers assigned to a member. In addition, an SA-ID Station will contain a list with at least one message type with priority identifiers. Priority identifiers will be used to determine an appropriate response by an SA-ID system. When an SA-ID system forwards or retransmits a message, priority information will be included in an augmented message transmitted by an SA-ID transceiver.

When a message carries a priority identifier, for example, indicating that it is from a first responder and/or is of an extremely urgent nature, even if the sender of the message is not a recognized member, an SA-ID system may be programmed to produce a response based on the message priority; which response may include retransmitting the message in augmented form.

SA-ID Element—

An SA-ID element is a device, module, enclosure, software module, remote control, sensor, actuator, transceiver, wiring, PC board, connector or input/output device that is included in at least one embodiment of an SA-ID system. The term "SA-ID" is used to indicate that it is compatible with, will interoperate with, or is co-located with or physically connected to at least one other SA-ID element in an SA-ID system.

An SA-ID Active Element in an SA-ID system is a first element of an SA-ID system that will generate, send, receive, respond to and/or otherwise interact with a message from a second Active SA-ID element. Any of an SA-ID module, device, component of a device, software module or software application that will interoperate with at least one other element of an SA-ID system is termed an SA-ID Active Element.

An SA-ID Passive element is a component of an SA-ID assembly that does not directly interact, interoperate, send, receive, or respond to a signal from an Active SA-ID element. For example, an SA-ID enclosure is considered to be an SA-ID Passive element.

An SA-ID Element is assumed to be active if no specific distinction is made.

SA-ID Device

—An SA-ID Device is an active SA-ID element that will interoperate with, or may be adapted to interoperate with, at least one other active SA-ID element to achieve a desired result.

SA-ID Station—

An SA-ID station is an implementation of an SA-ID embodiment that is an assembled, configured, and operating package containing at a minimum two active interoperating SA-ID devices that together will implement an SA-ID function as discussed herein. An SA-ID station may contain a software module appropriate to the embodiment and application. Elements of an SA-ID Station are assembled and configured to operate together as a single unit.

Interoperable SA-ID devices and modules may be incorporated into an SA-ID Station enclosure or located remotely from an SA-ID Station and connected by a communications link to at least one transceiver in an SA-ID station.

A self-contained SA-ID mailbox embodiment, as shown for example, in FIG. 9-11, is considered to be an SA-ID station, as is a column-mounted SA-ID implementation as depicted for example, in FIG. 12-17.

In at least one embodiment of the invention, an SA-ID station will contain one or more waterproof enclosures for the installation of SA-ID modules and devices that will operate for extended periods during flood conditions and/or under water, mud etc.

SA-ID Light Source (SLS)—The term "SLS" refers to an SA-ID light source. An "SLS array" may include at least one solid-state light source, for example, an LED, OLED, laser-driven source and/or other type of light-producing solid state device, and/or at least one non-solid-state light source, such as, e.g., electrochemical, discharge lamp (e.g., FL, CFL), HMI, induction lamp, excimer lamp, plasma lamp, incandescent lamp, halogen lamp, arc lamp or a combustion light source.

SA-ID Augmented

Message-A message may be received from a first transceiver and retransmitted to a second transceiver with modified additional information attached, such as for example, the time of message receipt and dispatch, location of the second transceiver, signal strength of the transmission, or other parameters useful for analyzing the transmission. This retransmitted message is referred to as an "augmented message" since additional information has been added to the original message. In addition to the original message and its associated metadata (for example, message type and priority, time sent, location ID, sender ID and priority, signal strength), an augmented message will include further data about a message, such as, e.g., the location ID of the transceiver, time received, signal strength, number of repetitions since original dispatch) A second transceiver may in turn forward a further augmented message to a third transceiver by adding its own additional information. This process will be repeated each time a message is forwarded from one transceiver to another. The process of message forwarding may be terminated once the message is received at a predetermined termination point such a 911 call center or dispatcher, or after a specified number of retransmissions. This will prevent long-repeating "echoes" of a message throughout an SA-ID system.

In at least one embodiment, if an alert message from a sensor device and/or a user remote control device is not repeated within a specified interval of time, the response triggered by the receipt of the original signal from an SA-ID remote device will be terminated. Conversely, multiple repetitions of a signal from sensor or remote alert device may cause an output response to be intensified, repeated more frequently, or cause an SA-ID system to take another action that is contained in an operating software program instruction module, such as elevating the message priority, according to system preferences.

SA-ID Location Code—When used with a fixed-location SA-ID embodiment, an SA-ID location code is programmed to identify the location of the device and/or the location of an occupant and/or the location of a device generating an alert in an SA-ID system. In a mobile embodiment, the location code can communicate the location of a mobile SA-ID system, using GPS or a reference location from an identified mobile SA-ID device or system, an SA-ID equipped streetlight or other SA-ID location ID device.

SA-ID System—An SA-ID embodiment that serves multiple users, devices and/or buildings may contain more than one SA-ID station. Each SA-ID station may send a different location code to distinguish its location from that of another SA-ID station in the SA-ID system. In this instance, the group of differentiated locations in which the various SA-ID devices are installed is referred to as an "SA-ID System."

SA-ID Device Code—An SA-ID Device code will identify a specific SA-ID device interoperating with, initiating and/or transmitting a message in an SA-ID system. Additional elements of a device code may be added to provide address information, identify an occupant, or provide other information.

Mobile Unit Code—An SA-ID Vehicle or Mobile unit code will identify a specific SA-ID vehicle or mobile device interoperating with, initiating and/or transmitting a message in an SA-ID system. Other information, such as for example, the identity of a driver and/or passenger may be included. For commercial vehicles that are members of a fleet, this code may include identification about the driver, condition of the driver, vehicle (e.g., OBD or VMRS codes) and/or passengers or contents, location, speed or other data useful to a fleet operator.

Member and Message Priorities—A Member is a recognized user of an SA-ID Network. Each of a multiplicity of different classes of Members may have different levels of priority; similarly, a multiplicity of different types of Messages may have different levels of priority. A priority identifier will be embedded in a Message to indicate priority information handling.

Messages and Priorities—A Message (which is defined to also include an Augmented Message) is a communication on an SA-ID network. Messages, including Augmented Messages, are classified into different Message types, and are assigned different Message Priorities in the system depending on the type of Message.

Examples of Member and Message Priorities, include (but are not limited to) the following:

| Priority Member | Priority Message |
|---|---|
| First Responder | Emergency Alert |
| Elderly | Flood Alert |
| School Administration | Fire Alarm |
| Public Official | Shooter alert |
| Critical Service personnel | Life threat alert |

Modes of Message Handling Operation in an SA-ID System

An SA-ID Station may be programmed to operate in an "Open" or "Closed" mode.

In an "Open" mode, an SA-ID station is programmed to respond to an Alert message received from any interoperating SA-ID device and respond following a programmed sequence that has been enabled for that class of SA-ID device and type of message. The message will be relayed by the transceiver in a first SA-ID receiving station over its network along with any additional data it is programmed to append (an "augmented message"). A second SA-ID station in open mode will receive a first augmented message from a first SA-ID station and will retransmit a second augmented message to other stations on its network.

When an SA-ID apparatus in open mode receives a message from an unrecognized emergency alert device on an open channel, it will forward such a "foreign" alert to the requisite service with a notice that contains the local address and the information that the alert comes from an unrecognized alert device. An alert message includes data about the sender.

At least one mode of operation will establish mesh communications over a large number of SA-ID stations. Messages will be augmented and retransmitted to a maximum number of retransmissions. After a message retransmission maximum is reached, an augmented message will cease to propagate unless it contains a priority ID in which case a greater number of repetitions may be permitted. Users in an open SA-ID system may be grouped into individual sets of at least one user per set in which the open system is programmed to respond differently to a message received from at least one user set.

A closed SA-ID station will receive and respond to an alert message received from at least one designated set containing at least one user. A closed system may contain more than one set of at least one user in a set in which a closed SA-ID system is programmed to produce at least one response and message transmitted by a user in that set to be different from a message received from a user in another set.

For example, an SA-ID station in closed mode located in a neighborhood may receive an alert message from a recognized user located in that location. The SA-ID station is programmed to execute a series of local responses at the location, such as for example flashing a coded sequence of light in colors and turning on a local video camera. The SA-ID station will propagate an augmented alert message based on the original alert message to other SA-ID stations in its network (i.e. neighborhood) that are programmed to receive it and respond. However, if a closed SA-ID station receives an alert message from an SA-ID remote alert device or other SA-ID signaling device that is not included in at least one set recognized members, a closed SA-ID station will not respond directly, although it may log the message.

On the other hand, an open SA-ID system will respond to and retransmit (in augmented form) any alert message received from an SA-ID remote control or SA-ID signaling device that is not a member of a recognized group. The response of an open SA-ID station and the augmented message transmitted may be programmed to be different, depending on whether or not the SA-ID remote control or SA-ID signaling device is a member of a recognized group. Unrecognized groups may still have hierarchy or "priority" relative to other message sources (i.e., a signal from a police department in another jurisdiction may have a higher priority than that of a motorist).

In this way, citywide networks may be integrated over wide areas, while still preserving the underlying "neighborhood" and "location" focus that is a fundamental feature of the invention.

An SA-ID system may be programmed to function as an "open SA-ID system" by a user or administrator with appropriate permissions, and will function as a communications receiving and redistribution gateway for a plurality of distributed SA-ID devices, at least one of which is not a member of that SA-ID system.

In an open SA-ID system, a first SA-ID transceiver will receive a message from a second SA-ID transceiver that is not recognized by the first SA-ID transceiver as a Member of the first transceiver's SA-ID system. The first SA-ID transceiver is programmed to take one or more actions in response, such as for example: (a) take no action at all at its location but keep a record of the message, (b) relay the first message with an attachment and send an augmented message to one or more transceivers within range, (c) relay the message from the first transceiver to a second transceiver in a gateway to an integrated network that will in turn attempt to reach a third SA-ID transceiver in an SA-ID system at a dispatcher location, (d) initiate a predetermined response at the location of the first transceiver that is determined by the nature and priorities assigned to the message from the second transceiver, such as for example, activating an alarm or alert signal.

Translucence and the Transmission of Light—The term translucence is used herein to refer to the ability of a material to transmit light through it. Translucence may vary from 100% T ("transparent") to 0% T ("opaque" or "mirrored"). Some materials may have different degrees of translucence depending on the wavelength of the incident light. In addition, the Reflectivity of the material must be considered, from 100% R (perfect mirror) to 0% R (no reflection) Internal vs external reflection must also be considered in the aesthetic design of an SA-ID Location ID display. Finally, the degree of scattering or distortion of transmitted or reflected light (focus) of the transmitted light must also be considered. A semi-mirrored material may appear to be opaque if lighted from one side only and the light is reflected back (e.g., a semi-mirrored panel) but if a lighted object or light source is placed on the other side, it will be visible through the semi-mirrored panel. This may be used, for example, to place a video monitor or printed transparency behind a semi-mirrored panel. When lighted only from the front and unlighted from the back, the video monitor or printed transparency will appear to be invisible. However, when the video monitor is turned on (i.e. lighted up) or the printed transparency lighted from behind, each will become visible to a viewer. Lastly, the collimation of the light is also a factor. All of these qualities are included in the use of the term "translucent" in the present application. However, the author's use of this term in the subject application does not make reference to the scattering, distortion or focusing of incident, transmitted, or reflected light, but only to the amount of light passing through a translucent medium.

Wireless Sensor Actuator Network (WSAN)

A WSAN may include many communicating sensors that are wired and/or wireless, digital and/or analog. These include but are not limited to:
- light beam sensors
- pressure-plate switches (e.g., drive-over or step-on)
- overhead door sensors
- water sensors
- window open sensors
- door openers
- biometric sensors
- magnetic switches
- glass breakage audio sensors
- gunshot audio sensors
- proximity sensors
- capacitance sensors
- infrared sensors
- pressure sensors
- flow sensors
- temperature sensors
- fluid level sensors
- air quality sensors
- chemical sensors
- vibration sensors
- motion sensors
- gunshot sound recognition devices (e.g., s/w with microphone)
- muzzle flash detection (s/w with camera)

FIGS. 32A-C illustrates representative sensors that can be incorporated into an SA-ID application-specific embodiment, e.g., through coupling with compatible transceivers and related electronics to amplify or transform a sensor output (such as, e.g., an A-to-D converter).

Ground-Penetrating Radar ("GPR")

GPR uses high-frequency (usually polarized) radio waves, typically in the range 10 MHz to 2.6 GHz. A GPR transmitter emits electromagnetic energy into the ground. When the energy encounters a buried object or a boundary between materials having different permitivities, it may be reflected, refracted, or scattered back to the surface. A receiving antenna may detect and record the return signal. The principles involved are similar to seismology, except GPR methods implement electromagnetic energy rather than acoustic energy, and energy may be reflected at boundaries where subsurface electrical properties change rather than subsurface mechanical properties as is the case with acoustic energy.

In the case of an SA-ID implementation, a GPR signal would be sent from an SA-ID electromagnetic or acoustic transmitter device so that it may be detected by an antenna in the vicinity. This capability is useful in cases of landslides, mudslides, avalanches, muddy floods, and ice storms, where other methods of signal transmission may not be effective. Due to the greater penetration afforded by lower frequency signals, and since an SA-ID system is generally not seeking to image obstacles in the ground, low frequencies are an exemplary method of implementation. However, in some cases, where a first responder may be seeking to image debris inhibiting access to a survivor, for example in a building collapse due to an explosion or earthquake, higher frequencies may also be employed. GPR may be directed from above as well as from below.

The electrical conductivity of the ground, the transmitted center frequency, and the radiated power all may limit the effective depth range of GPR investigation. Increases in electrical conductivity attenuate the introduced electromagnetic wave, and thus the penetration depth decreases. Higher frequencies do not penetrate as far as lower frequencies because of frequency-dependent attenuation mechanisms. However, higher frequencies may provide improved resolution. Thus, operating frequency is a trade-off between resolution and penetration.

Optimal depth of subsurface penetration is achieved in ice where the depth of penetration may achieve several thousand meters at low GPR frequencies. Dry sandy soils or massive dry materials such as granite, limestone, and concrete tend to be resistive rather than conductive, and the depth of penetration could be up to 15-meters (49 ft). In moist or clay-laden soils and materials with high electrical conductivity, penetration may be as little as a few centimeters (1-2 inches).

Ground-penetrating radar antennas are generally in contact with the ground for the strongest signal strength; however, GPR air-launched antennas may be used above the ground by low-flying aircraft and/or by flying or submersible drones (see FIG. 18).

The spirit of the present application provides a breadth of scope that includes all methods of creating a lighted address identification display, secure mailbox and community alert station, each of which may be coupled to a user remote control device and connected to an integrated communication network. Any variation on the theme and methodology of accomplishing the same objective that is not described herein would nevertheless be considered to be covered under the scope of the present application. The foregoing description of the exemplary embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present application. Further combinations of the different embodiments would be within the scope and possession of the invention and knowledge of the inventor or those skilled in the art, and are considered to be covered under the scope of the present disclosure Similarly, the order or arrangement of the module or device layers would also be considered to be covered under the scope of the present application. For example, e.g., separation of the storage devices from the PV or wind generator module, or the inclusion of additional separate supplementary storage devices, or moving a device from one modular package to another, or shuffling the order devices or modules in an implementation, would all be considered to be included as embodiments within the scope of the present application, provided that the purpose and function of the final assembly provided functionality that was equivalent to that described in the specifications herein.

Other features, advantages and configurations of the present application will become apparent to one skilled in the art upon examination of the detailed description together with the accompanying drawings. It is intended that all such features, advantages and configuration be included herein as embodiments within the scope of the present application and protected by the claims thereof.

Depending on the embodiment, certain acts, events, devices or functions of any of the processes or algorithms described herein may be performed in a different sequence, may be added, merged, or left out altogether (e.g., not all described operations or events are necessary for the practice of the invention). Moreover, in certain embodiments, operations or events may be performed concurrently, e.g., through multi-threaded processing, interrupt processing, or multiple processors or processor cores or on other parallel architectures, rather than sequentially.

The various illustrative logical blocks, device functionality, modules, routines, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The steps of a method, process, routine, or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of a non-transitory computer-readable storage medium. An exemplary storage medium may be coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above description has shown, described and pointed out novel features as applied to various embodiments, it may be understood that various omissions, substitutions and changes in the form and details of the devices or algorithms illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain embodiments disclosed herein is indicated by the appended claims rather than by the foregoing description. All changes which come within the meaning and range of equivalency of the claims are to be embraced within their scope.

The above embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present application may be further understood by examining this specification.

The figures and drawings included herein depict some, but not all, SA-ID embodiments and application-specific implementations of SA-ID embodiments and have been selected to illustrate representative combinations of SA-ID devices, elements, and modules. The figures are not intended to depict all possible combinations, embodiments, or application-specific implementations of embodiments.

For simplicity of illustration in the figures, details of wiring, connectors and mounting are not shown, as methods of wiring and interconnection are well-known in the field. None of the drawings included herein is to any scale.

To one skilled in the art, it will be apparent that various omissions, substitutions and changes in the form, details and placement of the devices, or alternative software algorithms, included in the specifications and illustrations can be made without departing from the spirit of the disclosure. As can be recognized, certain embodiments of the inventions described herein can be configured in a form that does not provide all of the features and benefits set forth herein, as some features can be used or practiced separately from others. The scope of certain inventions and embodiments disclosed herein are indicated by the appended claims as a synopsis of the descriptions and drawings. All changes which come within the meaning and range of equivalency of the claims are to be embraced within their scope.

The invention claimed is:

1. A system of interoperating modules that inter-communicate bi-directionally over a range of frequency bands and sensory modalities, transmit messages to at least one local communications gateway multiband station at or near a location, and continue to operate continuously for a period not less than 36 hours during a catastrophic event where local electricity, telephone and/or cellular service has failed, the system being a more resilient and effective location identification network for a location or community in times of emergency than previously available solutions, the system comprising:
    at least one source of local renewable energy removably connected to a powered device;
    a stored energy module connected to one or more rechargeable energy sources of sufficient capacity and operating characteristics to continuously operate the powered device to support bidirectional data interchange, communications and messaging between a location and an outside receiver for a minimum of 3 days when fully charged without further recharging, even under a most extreme weather, smoke and environmental conditions;
    a set of detectable multi-frequency and multimodal communication input and output modules that may be located or relocated in a location, at or near a point or points of entry to the location, wherein the at or near the point or the points of entry to the location include where a street meets a driveway, or place associated with a mailbox serving the location; and
    a plurality of sensors to measure specific local conditions data and report the measured specific local conditions data to the local communications gateway which seeks an available communications channel and relay the message and additional relevant information about the location and/or occupant to an outside receiver wherein signals will be processed by a computer using artificial intelligence to combine all the data and assess a local event and initiate a course of action in response.

2. The system of claim 1, wherein, based on the assessed local event, the computer instructs at least one addressable module in a local system to respond in a predetermined manner, depending on a specific set of conditions that is assessed.

3. The system of claim 2, wherein a report, if appropriate, is sent to a local authority or first responder.

4. The system of claim 2, wherein in response to the computer's assessment of a situation, messages are prioritized and retransmitted by the computer.

5. The system of claim 1, wherein a communication being transmitted is encrypted in at least one way, so that when the communication is distributed to at least one receiver, the at least one receiver can decode and access a portion of a message of the communication based on a hierarchical code that provides access to at least one specific segment of an encoded message.

6. The system of claim 1, wherein a communication gateway module and interactive address display are attached to, or built into, a secure enclosure, wherein the secure enclosure comprises a mailbox or a post supporting a mailbox.

7. The system of claim 1, wherein a communication gateway module and interactive address display are attached to, or built into, an interior or exterior light fixture or location, comprising a ceiling mounted fixture, a wall mounted fixture, a floor mounted fixture, a pathway bollard, a streetlight, a sign, or an electric gate.

8. The system of claim 1, wherein a communication gateway module and interactive address display are anchored into a ground with barbed stakes.

9. The system of claim 1, wherein a message authorization table contains the names and hierarchical ranking senders and receivers, and of incoming and outgoing messages from friends, family, authorities, service providers, and/or others.

10. The system of claim 1, wherein the system is used to monitor, report and record conditions that exist at an electric utility distribution transformer.

* * * * *